United States Patent [19]

Holler

[11] Patent Number: 4,721,951

[45] Date of Patent: Jan. 26, 1988

[54] METHOD AND APPARATUS FOR COLOR SELECTION AND PRODUCTION

[75] Inventor: Peter B. Holler, San Mateo, Calif.

[73] Assignee: Ampex Corporation, Redwood City, Calif.

[21] Appl. No.: 605,023

[22] Filed: Apr. 27, 1984

[51] Int. Cl.[4] .......................... G09G 1/16; G09G 1/28

[52] U.S. Cl. ..................................... 340/701; 340/703; 358/80

[58] Field of Search .................... 340/703; 358/75, 80

[56] References Cited

U.S. PATENT DOCUMENTS

| | | | |
|---|---|---|---|
| 4,379,292 | 4/1983 | Minato et al. | |
| 4,386,345 | 5/1983 | Narveson et al. | 340/703 |
| 4,475,161 | 10/1984 | Stock | 358/80 |
| 4,482,917 | 11/1984 | Gaulke et al. | 358/75 |
| 4,496,968 | 1/1985 | Pugsley | 358/80 |
| 4,573,071 | 2/1986 | Sakamoto | 358/80 |

*Primary Examiner*—Marshall M. Curtis
*Attorney, Agent, or Firm*—Rodney L. Marett; Bradley L. Perkins; Ralph L. Mossino

[57] ABSTRACT

A color selection apparatus and method wherein a color is selected on the basis of one color characteristic system for implementation in another color characteristic system. A display is generated which is indicative of possible values of one color characteristic from the first color characteristic system, from which a value is chosen. A display is generated which is indicative of a relationship between values of a second color characteristic and the first color characteristic selected. A value for the second color characteristic is selected. The color characteristics, from the first color characteristic system, that have been selected are converted to the second color characteristic system, which is then implemented.

36 Claims, 16 Drawing Figures

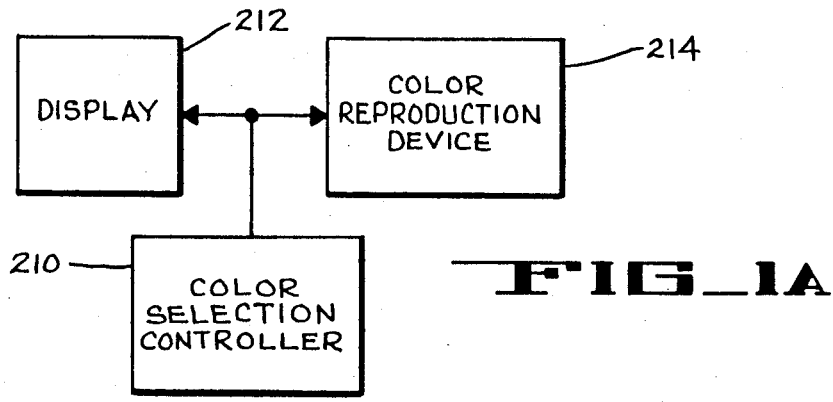
FIG_1A
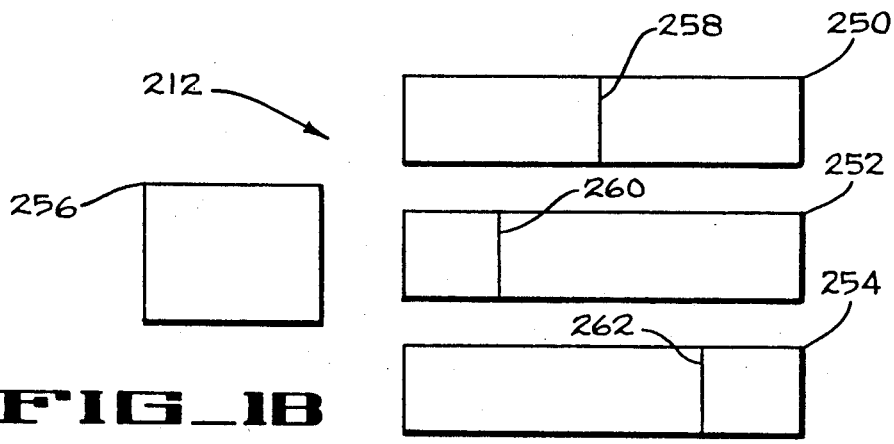
FIG_1B
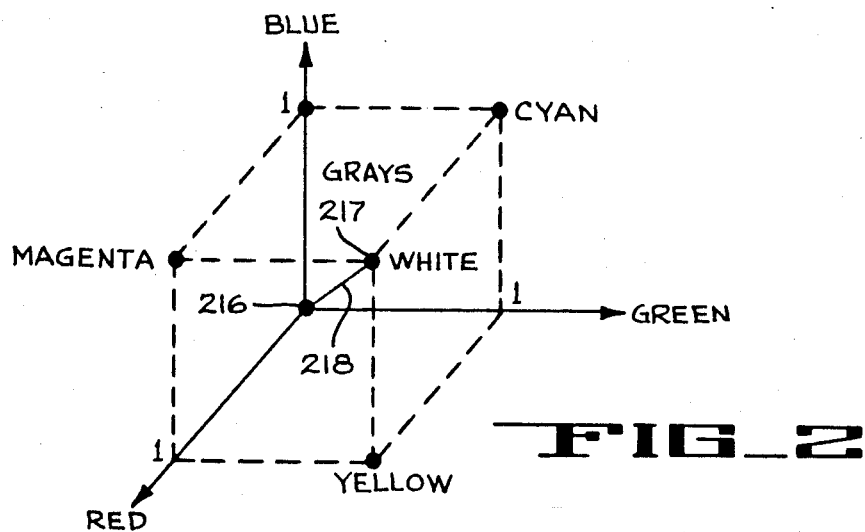
FIG_2

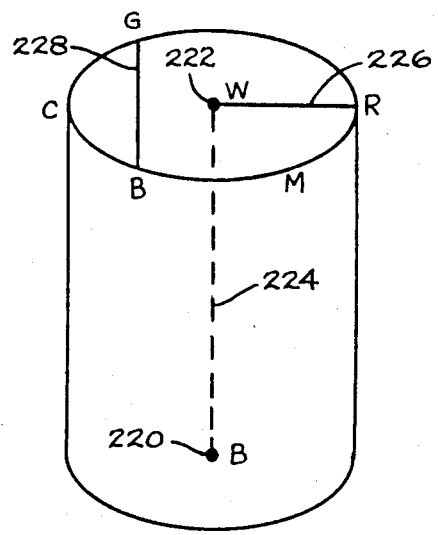
FIG_3
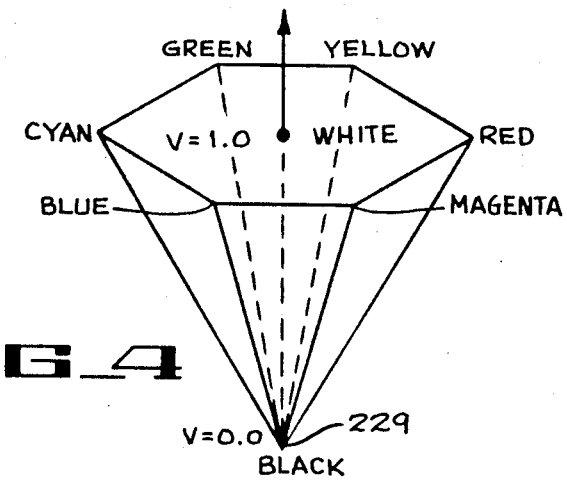
FIG_4
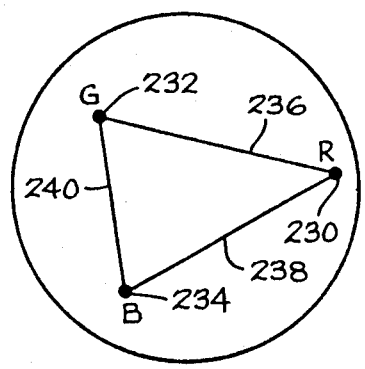
FIG_5

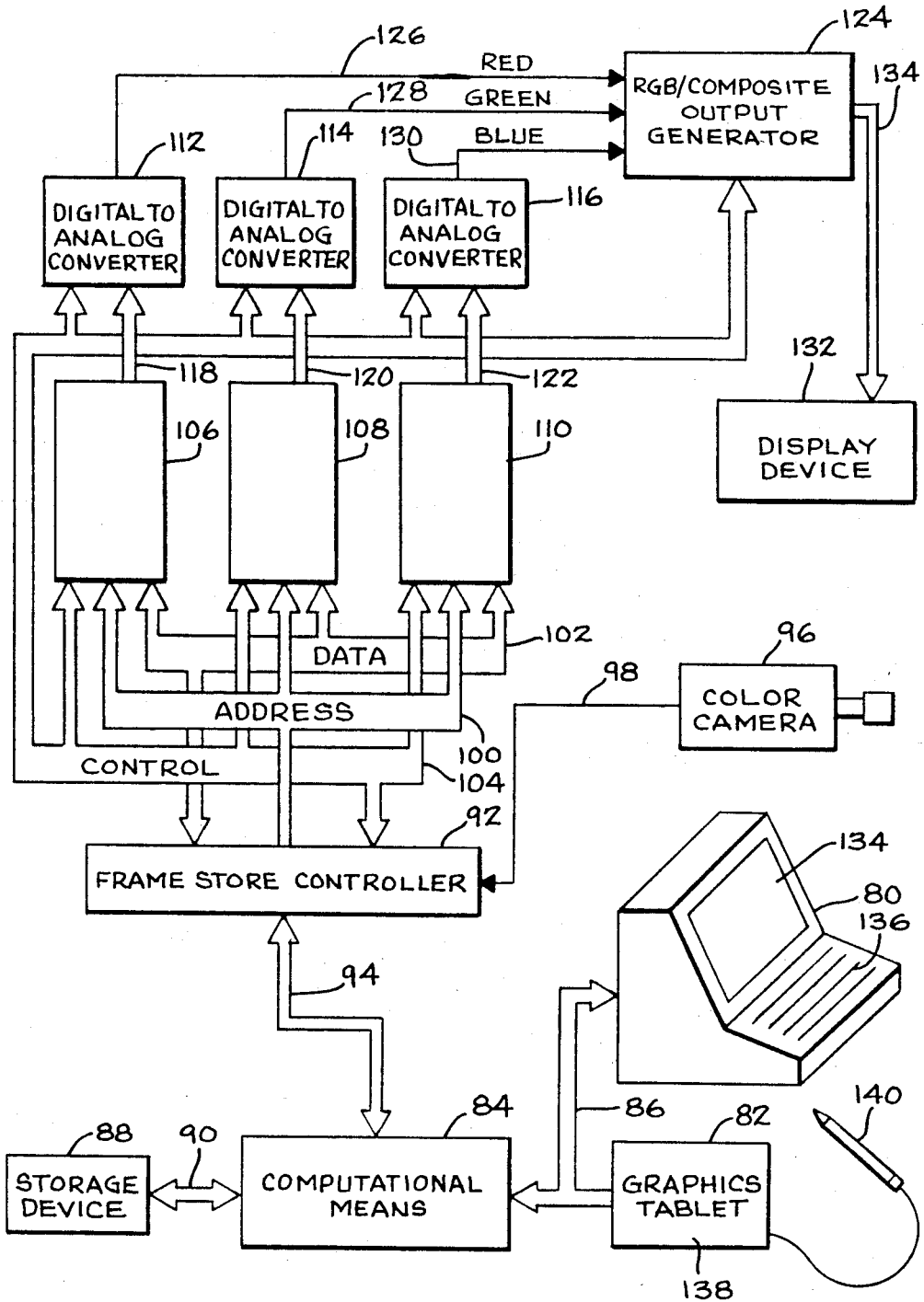
FIG_6

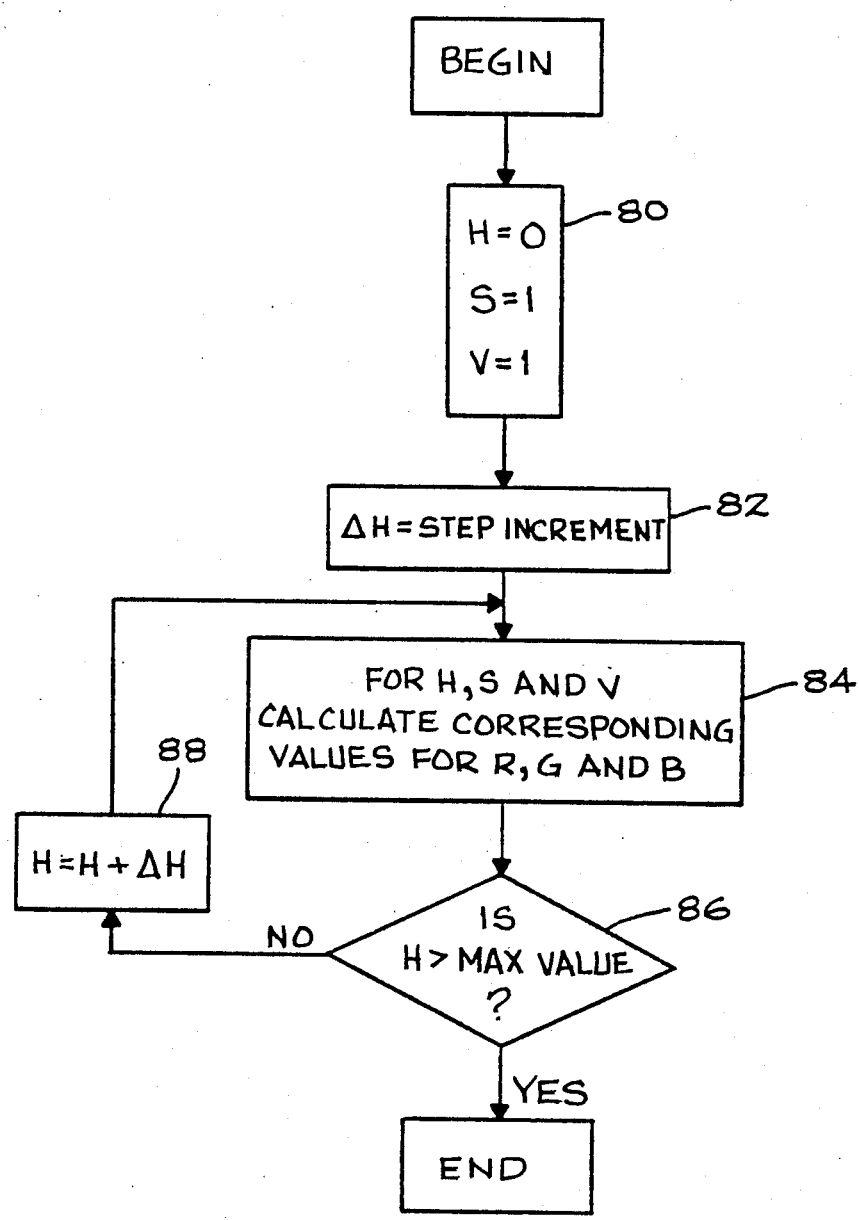
FIG_7A

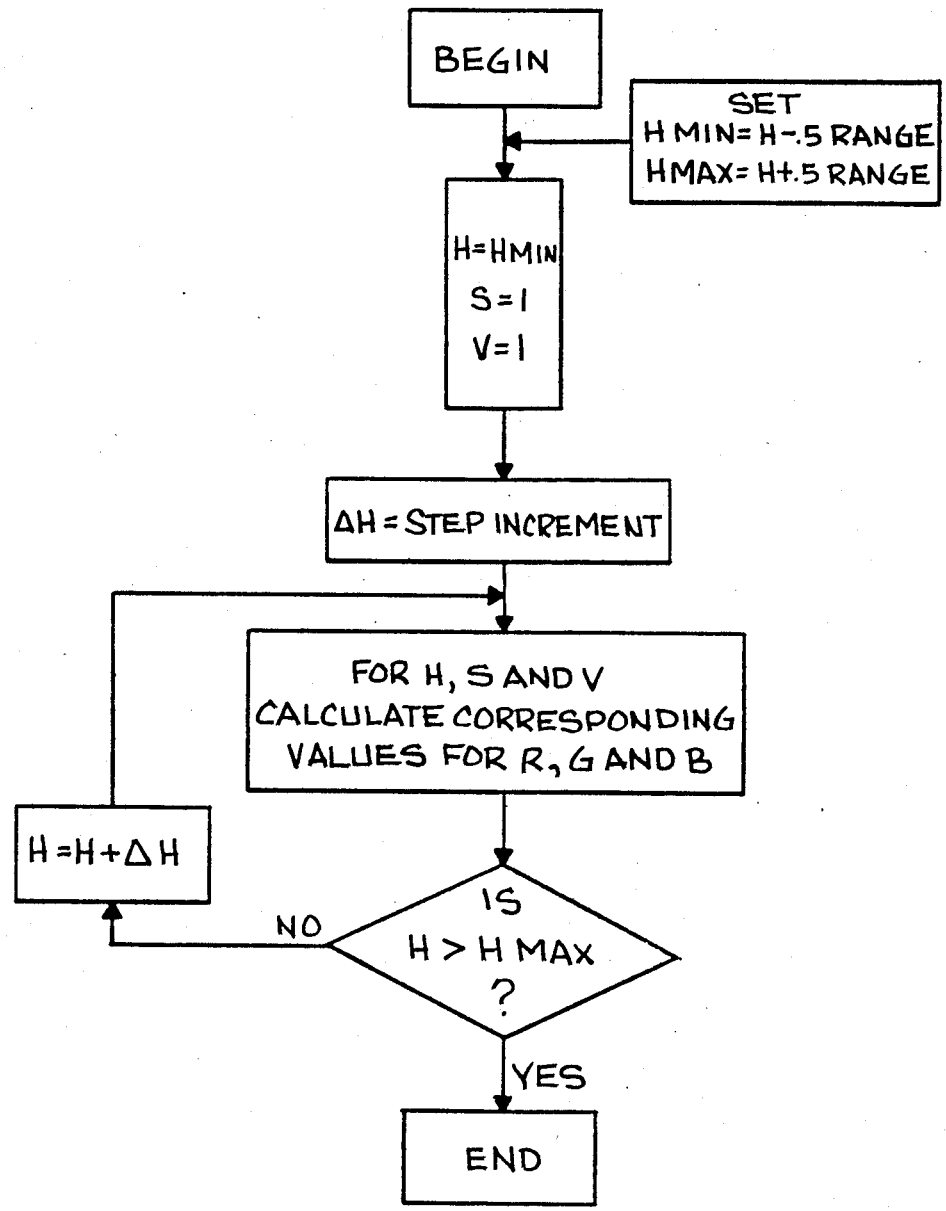
FIG_7B

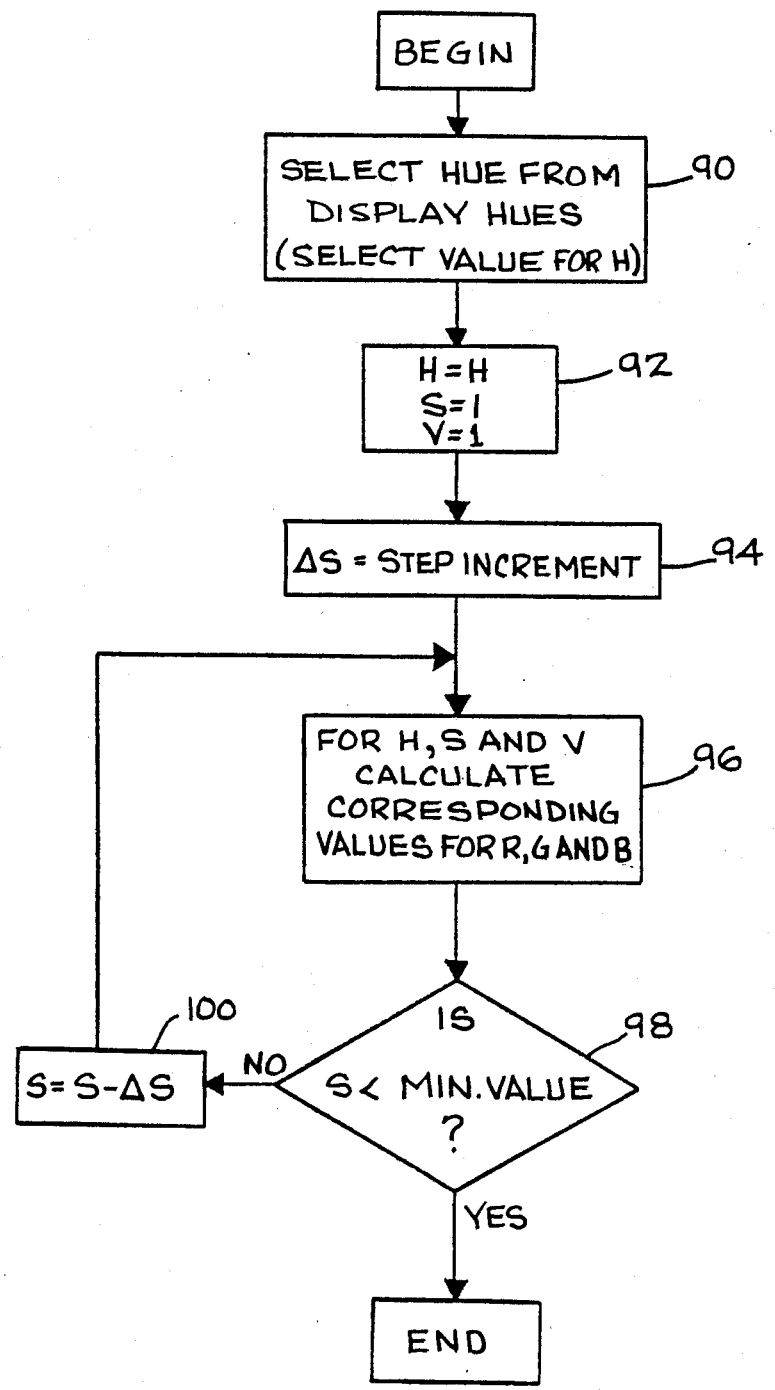
FIG_8

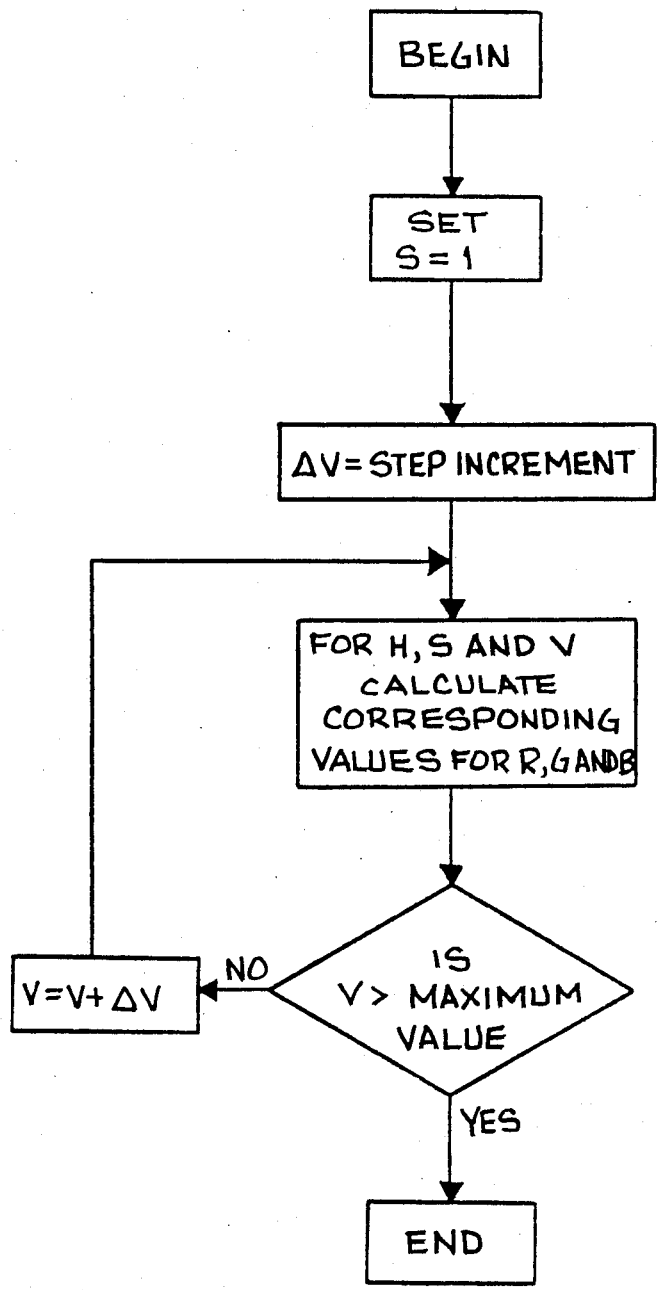
FIG_9

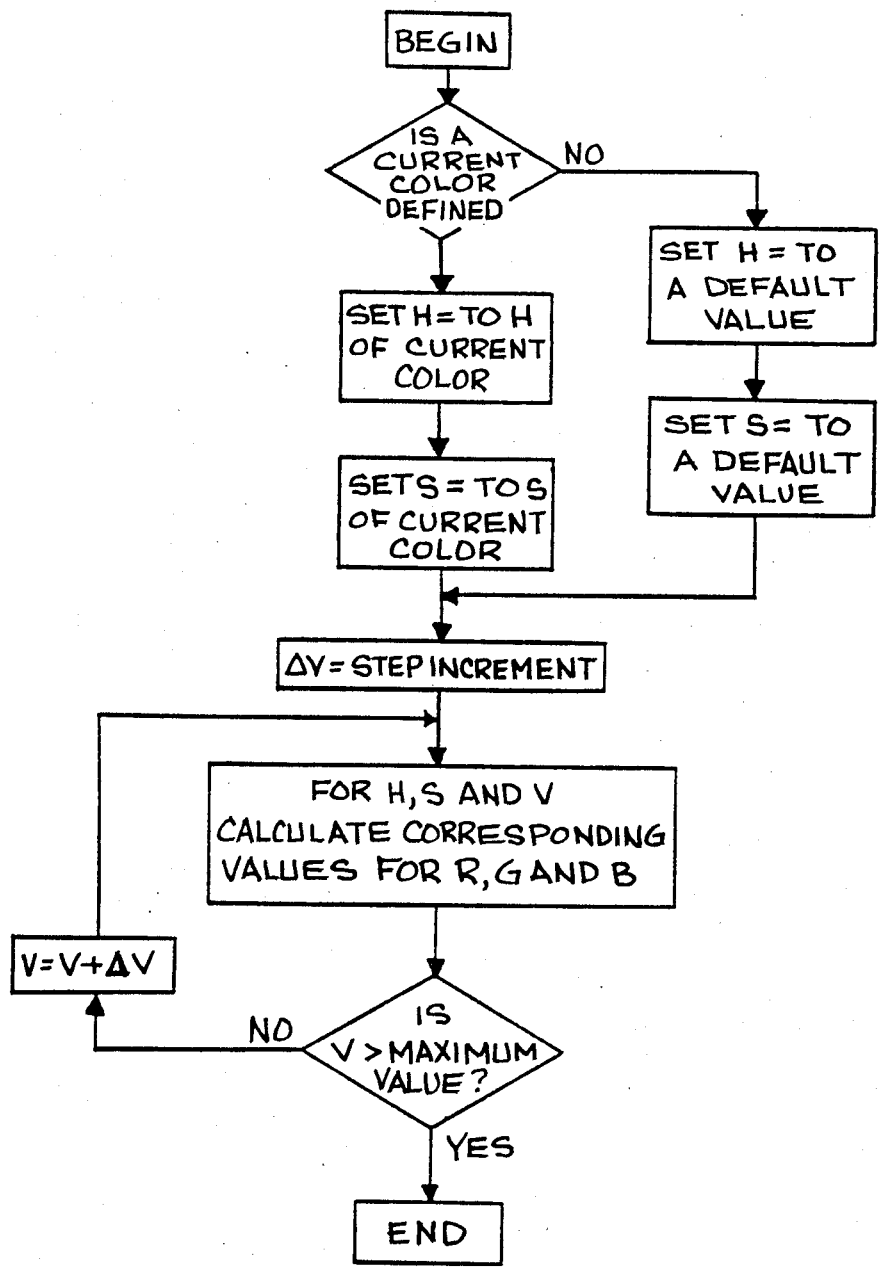
FIG_9A

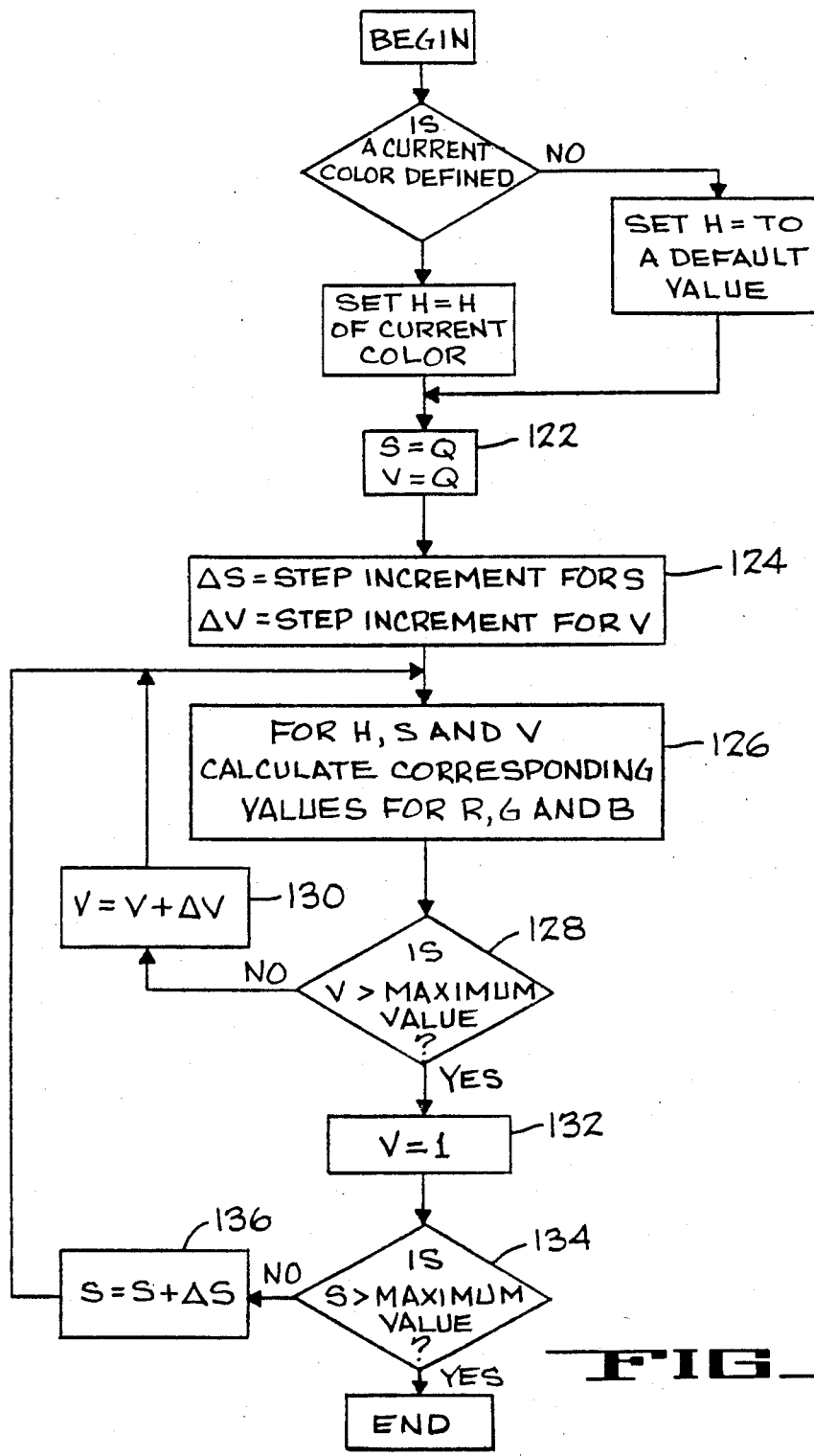
FIG_10

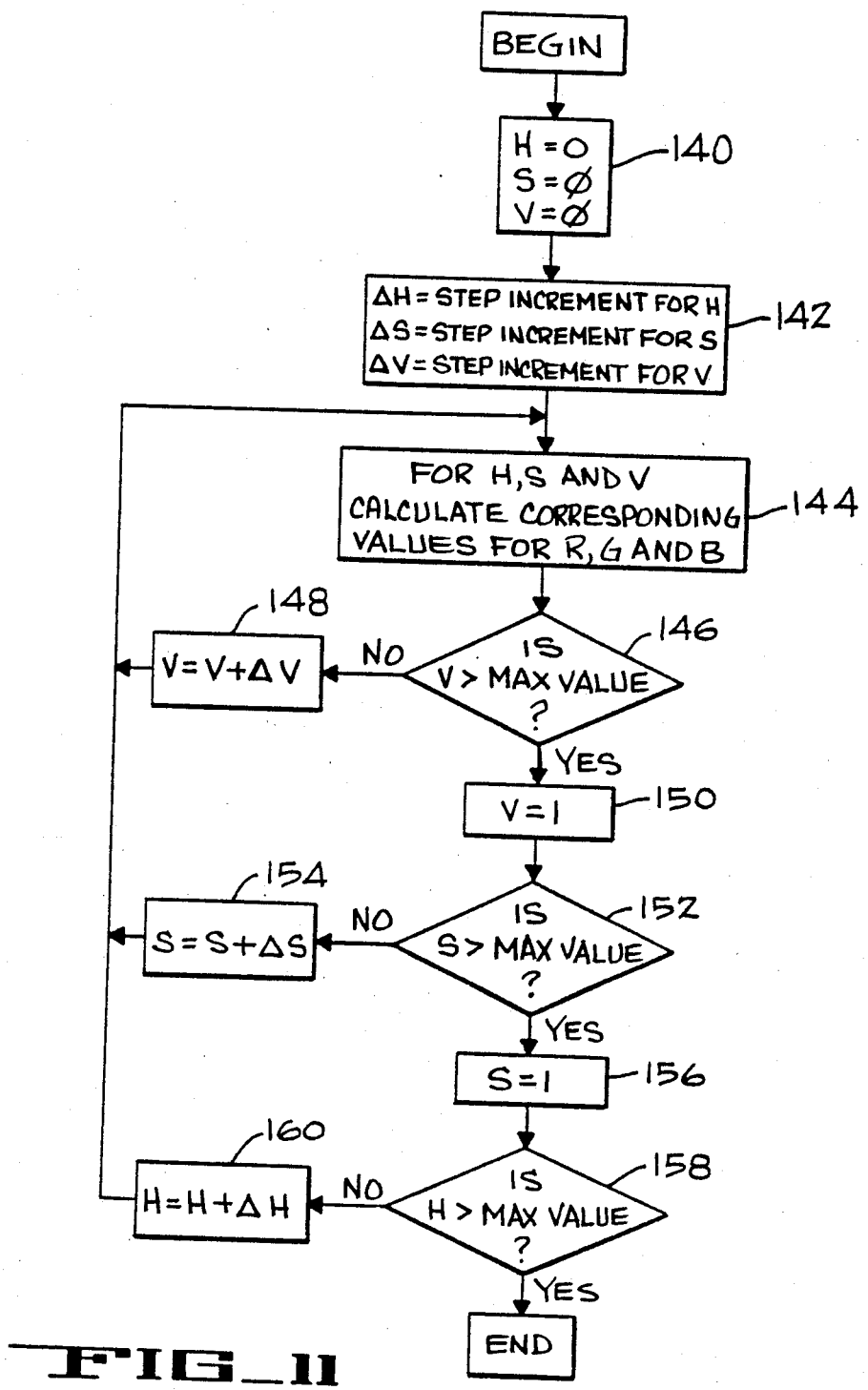
FIG_11

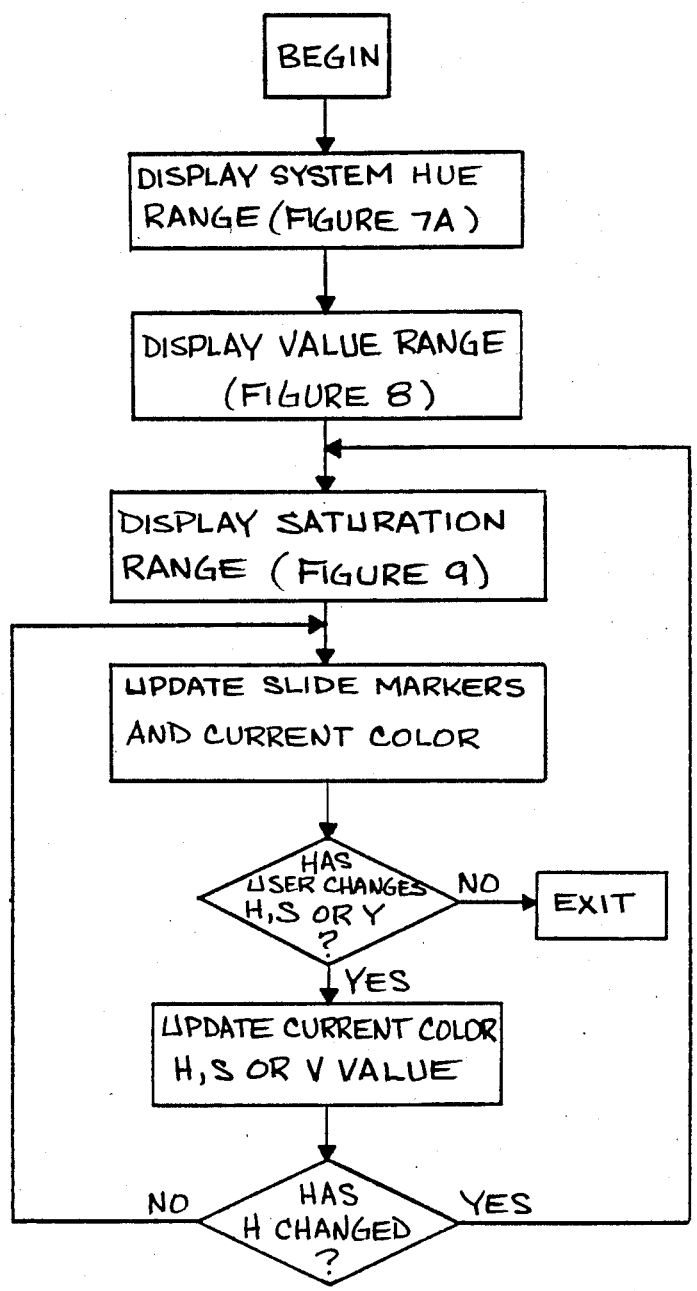
FIG_12A

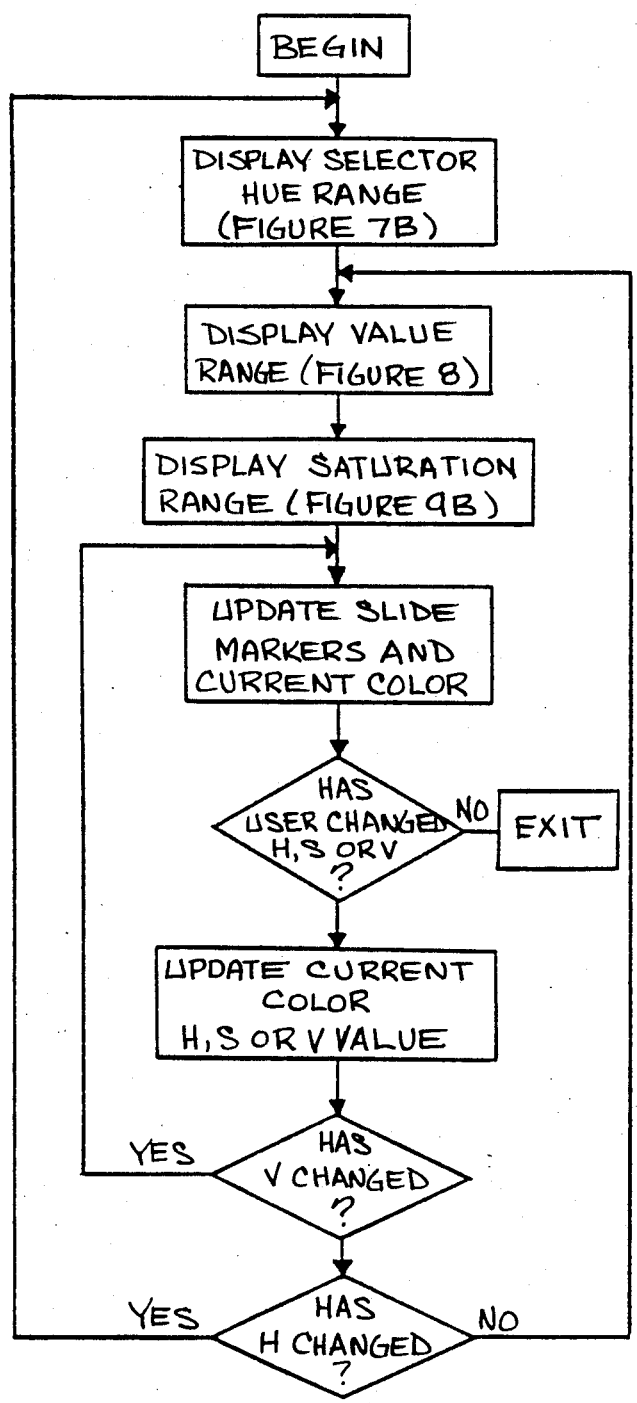
FIG_12B

METHOD AND APPARATUS FOR COLOR SELECTION AND PRODUCTION

BACKGROUND

This invention relates generally to the selection and production of color, and more particularly to a method and apparatus for selecting a color according to color characteristics of one color classification system and reproducing the selected color in accordance with color characteristics of a different color classification system.

When a beam of white light is passed through a prism, the beam is spread into a well known band of colors. The colors in the band are fully saturated colors, which are considered "pure" colors, and are generally referred to as the spectral hues. While the band contains a large number of hues that form a continuous spectrum, an observer perceives seven distinct hues identified as red, orange, yellow, green, blue, indigo and violet, which appear to blend smoothly from one into another. The complete range of visible colors contains a vast number of colors in addition to the fully saturated colors or spectral hues. These additional colors can be created by combining appropriate hues in selected proportions.

In practice, however, colors are created in a medium defined by a set of primary colors, with a particular color created as a mixture of the primary colors included in the set. Primary colors are selected according to their ability to create a wide range of colors in a given mixing medium. For example, in projected light media such as the common video cathode ray tube (CRT) display, the additive set of primaries red, green and blue (RGB) are often used, while in reflective media such as the common 4-color printing process, the subtractive set of primaries cyan, magenta, yellow and black are often used. As there are many mixing media, there are many sets of mixing primaries. However, since primary sets mix colors, rather than pure spectral hues, to create other colors, no primary sets can create the complete range of visible colors. The term "color gamut" is used to describe the set of colors which can be created by a particular set of primary colors.

In describing the 4-color printing process, black was identified as a primary of the subtractive set of primary colors. Technically, black is not a color, but is a result of the absence of color. The mixing media of the 4-color printing process utilizes black to create black and shades of colors otherwise not obtainable by mixing the actual colors included in the primaries of the subtractive set. On the other hand, black exists in an additive mixing medium when there is absence of all primaries.

Similarly, white is not a color. In an additive mixing medium, white can be created by combining equal proportions of a pair (or pairs) of complementary colors included in the color gamut obtainable from the primary set. In subtractive mixing media, white exits when there is an absence of all primaries.

While colors may be produced using alternative techniques in various media, broadly speaking, color perception is a subjective visual experience resulting from the stimulation of the retina by light. Visual sensations produced from observation of a given light vary from observer to observer, because the response characteristics of retinas vary from observer to observer. Moreover, the retina is able to distinguish only a small fraction of the colors included in the range of visible colors, and its sensitivity to color is affected markedly by the level of received light. To aid in identifying and distinguishing colors, several color classification systems have been developed to represent colors through models. Each classification system consists of a set of color characteristics, often attributes of appearance of light, used to specify different colors according to varying values of the characteristics.

In some classification systems, colors are classified according to a set of primary colors, each primary of the set being a color characteristic. In these systems, the proportions of primaries determine the color. The aforedescribed CRT display and 4-color printing process are examples of color systems that produce a range of colors that can be described by models based upon such classification systems. However, such color classification systems lack subjective color characteristics colloquially used to describe color and thus are difficult to use. In other classification systems, colors are classified according to characteristics of hue, saturation and value (HSV), the numeric quantities of each determining the color. These classification systems are based upon the intuitive notions of hue, saturation and value. Consequently, models of such classification systems provide a framework for classifying colors in terms of subjective color characteristics that can be dealt with more naturally. While the hue, saturation and value (HSV) color characteristics systems will be discussed at length in connection with the present invention, the characteristic properly designated as "value" will be referred to as "brightness" to avoid confusion with references to numeric value.

Models of such color classification systems are described in Joblove, G. H. and D. Greenbert, "Color Spaces for Computer Graphics", SIGGRAPH 78 Proceedings, published as Computer Graphics, 12(3), August 1978, pp. 20-27 and Smith, A. R., "Color Gamut Transform Pairs", SIGGRAPH '78 proceedings, published as Computer Graphics, 12(3), August 1978, pp. 12-19, which are incorporated by reference herein.

With respect to the various color classification systems, there generally exist mathematical transforms which provide a mapping function between different color classification systems. Such transforms are frequently useful, for they provide a means whereby corresponding color points in different color classification systems may be located. For example, a particular color specified in terms of the color characteristics of a hue, saturation and brightness color classification system can be converted to the corresponding color characteristics of a red, green and blue primary color classification system through use of the associated transform. Such a technique would naturally find a broad range of applications in dealing with color in various media. By way of example with respect to the color video CRT medium wherein color is specified in terms of relative portions of the primary colors of red, green and blue, a particular color specified in terms of the color characteristics of hue, saturation and brightness can be directly converted and displayed in the CRT medium through use of the associated transform to determine the respective amounts of red, green and blue necessary to reproduce the particular color. In a similar manner, for any color displayed in terms of the color characteristics of red, green and blue the corresponding hue, saturation and brightness color characteristics could be likewise obtained to reproduce the color. In dealing with other media for the production of color, such as printing, wherein the color characteristics may be the primaries cyan, magenta, yellow and black, the corresponding amounts for each of the primaries could be determined in a similar manner to reproduce a color specified in terms of hue, saturation and brightness color characteristics.

Numerous techniques have been taken in the past with respect to the process of color selection and production. In one such technique, a user is provided the ability to choose a particular color from a set of pre-defined colors. While the set of predefined colors may be changed, the colors contained within the set are fixed during a selection process to individual and distinct colors. While the number of colors present may be large, the choice of the user is nevertheless restricted during a selection to colors which are present within the pre-defined set of colors. The restriction of freedom of color choice to a group of pre-defined colors is highly undesirable.

In an alternate technique of color selection and production used in the past, color selection is achieved through the display of a set of pre-defined colors along with independent displays of numeric values of hue, saturation and brightness color characteristics associated with a particular color selected from the set. In accordance with this technique, a set of individual, distinct, pre-defined colors are displayed to the user along with a display of three linear lines. Each line represents numeric values associated with one color characteristic. That is, one line represents numeric values of only the hue color characteristic, a second represents numeric values of only the saturation color characteristic and the third represents numeric values of only the brightness color characteristic. Selection of a color starts with the selection of one of the displayed pre-defined colors. This selection causes indications to appear in the three linear lines each independently specifying the numeric values of one of the hue, saturation and brightness color characteristics defining the selected pre-defined color. Colors other than the pre-defined color can be obtained by selecting different numeric values from one or more of the independently displayed numeric values of color characteristics. While the ability to select different numeric values of color characteristics does enable selection of colors in addition to the displayed pre-defined colors, the independent displays of the numeric values of the color characteristics does not permit the user to observe interactions of any combinations of the color characteristics other than the final selected color resulting from the combination of all color characteristics, namely, hue, saturation and brightness. Moreover, this technique does not offer to the user the ability to view all colors which are present in the color gamut. Only the set of pre-defined colors and the selected color (if different) are displayed. The limited display of colors also fails to display any of the colors adjacent to the selected color, because the adjacent colors invariably are located in the color gamut between the selected color and pre-defined colors.

SUMMARY OF INVENTION

In accordance with the present invention, apparatus and method are provided for selecting a color according to color characteristics of one color classification system and reproducing the selected color in accordance with color characteristics of a different color classification system. The selection process is performed in conjunction with a color display including displays for values of the color characteristics, which in the preferred embodiment are hue, saturation and brightness, as well as the color resulting from the selection of the color characteristics. Further, the interaction of selected values of color characteristics with the range of available values of other color characteristics are displayed so that the user may observe interactions of combinations of selected values of the color characteristics, thus facilitating color selection.

In the preferred embodiment, hue may be selected from a display of the entire array of system hues from which a desired hue may be selected. Either the entire range or a portion of such range of hues may be displayed at the same time, the hue display being scrolled on command to reveal all system hues when a portion of the range of systems hues are displayed.

The selected hue is then reproduced on a saturation display which illustrates the entire range of saturation of the hue extending from the pure system hue to white. Each change in hue produces a resulting change in the saturation display, more readily facilitating selection of the desired saturation value of the selected hue.

A brightness display may illustrate the range of brightness extending from black through the gray scale to white or, alternatively, the selected desaturated hue may be displayed at one end of the scale with the full range of brightness thereof being shown.

The use of these interactive displays enables the user to alter values of each characteristics independently based on observation of the effects of such change. Through the ability to view the effects of independent changes of characteristics, considerations of subjectiveness, intuitiveness and perceptiveness of the user required to anticipate the effects of changes in characteristics when only the final result is seen can be avoided.

Selection of the color characteristics, such as hue, saturation and brightness, of the color classification system for color selection provide numerical values for conversion into a set of color characteristics of a different color classification system, such as an additive or subtractive primary system, for reproduction of the color.

The advantages of the apparatus and method of this invention will be more readily apparent when the following detailed specification is read in connection with the drawings wherein:

DESCRIPTION OF DRAWINGS

FIG. 1A is a schematic block diagram illustration of the color selection and reproduction system of the present invention;

FIG. 1B is an illustration of the displays for displaying the selected colors and the color characteristics from which colors are selected;

FIG. 2 is a model depicting both an additive primary color classification system defined by red, blue and green primary color characerics and a subtractive primary color classification system defined by cyan, magenta, yellow and black primary color characteristics;

FIG. 3 is a model depicting the HSV color classification system defined by hue, saturation and brightness color characteristics;

FIG. 4 is a model depicting the HSV color classification system used in the preferred embodiment implementation of the present invention;

FIG. 5 is a model depicting the color space in a red, green and blue color television CRT medium;

FIG. 6 is a schematic block diagram of preferred embodiment of the present invention;

FIGS. 7A and 7B illustrates program flow charts for generation of hue bar displays;

FIG. 8 illustrates a program flow chart for generation of a saturation bar display;

FIGS. 9A and 9B illustrate program flow charts for generation of brightness bar displays;

FIG. 10 illustrates a program flow chart for generation of a color chart for a selected hue;

FIG. 11 illustrates a program flow chart for generation of a color chart of a color gamut associated with a set of primary colors; and FIGS. 12A and 12B illustrates program flow charts for selection and reproduction of color.

DETAILED DESCRIPTION

Referring now to the drawings, color selection and reproduction are accomplished in accordance with the present invention by apparatus and method which enable the selection of a color to be accomplished through the use of a first set of color characteristics which are displayed in a manner allowing simple and rapid human selection. Mathematical values for the selected characteristics are then transformed to a second set of color characteristics for implementation in the reproduction of the color described by the second set of characteristics. This second set of color characteristics is selected in accordance with the apparatus or mixing medium elected for reproduction of the color.

A generalized system for implementation of the color selection and reproduction method of this invention is illustrated schematically in FIG. 1A, wherein a color selection controller 210 is used interactively by an operator to select the color characteristics from a first set of color characteristics in accordance with the display of such characteristics on a display 212, which is preferrably on a color monitor utilizing color CRT mixing medium based on the red, green and blue color characteristic primary system. However, any suitable color display device may be used.

As will be described in detail hereinafter, the color characteristics are displayed on the monitor 212 for viewing by an operator, such that the operator may change values selected for each color characteristic independently by operation of the color selection controller 210. As the value of each characteristic is changed, the new value is used to update the display on the monitor 212 to show the effects of the change. This facilitates further adjustment of characteristics in an interactive manner.

When a final color has been selected, the color selection controller 210 transforms the color from the first set of color characteristics to a second set of color characteristics for transmission to a color reproduction device 214, which may be any suitable device such as a printer, a paint mixer or a color monitor. If desired, implementation of the color could be on the same monitor used for the display 212.

In the preferred embodiment, the color is selected in accordance with the characteristics of hue, saturation and brightness of a color classification system represented by the mathematical parameters H,S and V. Implementation of the color is in the red, green and blue (RGB) color characteristics for an additive color classification primary system, such as used in the aforedescried color television CRT medium.

A model of the RGB primary system is illustrated in FIG. 2, wherein each of the primary colors red, green and blue is shown on an axis of the system, with values for the amount of each primary, or color characteristic, ranging from a minimum of zero to a maximum of one. The axes intersect at an origin 216 at which the value for each of the primaries is zero. The result of this combination of primaries is black.

When all three primaries are mixed in equal quantity at their maximum values, the result is the white located at point 217 in FIG. 2. A mixture of an equal quantity of the three primaries less than their maximum values, but greater than their minimum values, produces a shade of gray, located at a point on a gray line 218 extending from point 216 to point 217. This line identifies all gradations in grays available in the color system. By mixing red, green and blue in various relative amounts, all colors available in this color classification system will be obtained.

It should be noted that the color cyan can be obtained by mixing blue of a level of one with green of a level of one, with the level of red equal to zero; magenta can be obtained by setting blue and red at one while green is set at zero; and yellow can be obtained by setting green and red equal to one while blue is set at zero. These three colors, along with black, form a subtractive primary color classification system, such as used in the aforedescribed printing mixing medium, which is directly mathematically related to the additive RGB primary system.

While primary color classification systems are highly suitable for machines, such as video displays, to produce color, they are generally unsatisfactory for human use in the selection of color. A preferred system for color selection is the HSV color classification system defined by hue, saturation and brightness color characteristics. Referring now to FIG. 3, a circular cylinder color coordinate model is illustrated for characterizing the colors in terms of hue, saturation and brightness. In this system, brightness is a linear quantity, ranging from zero brightness (black) at point 220 to maximum brightness (white) at point 222. Between these points is a line of grays 224 extending through the center of the cylinder. Hue is an angular quantity measured in degrees circumferentially around the gray line 224. Saturation is a linear quantity represented as the radius of the circular cylinder. A zero value of saturation represents a point on the gray line 224 and a maximum value of saturation represents a pure or fully saturated hue, desaturated hues being represented at radial points therebetween. By selecting a hue and designating its level of saturation along with its brightness, any one of the full range of colors within the color gamut of the system can be specified.

In this cylindrical representation of an HSV system, the hues located at the circumference of the system represent pure, fully saturated hues, such as the hues found in the white light spectrum. In FIG. 3, the circumferential positions of the additive and subtractive primaries red, magenta, blue, cyan, green, yellow have been illustrated, but are intended only to show specified hues for reference purposes. The array of hues is a continum.

It should be noted that any hues or colors at points in the HSV system can be mixed to create a range of other colors. For example, white and red could be blended to create a range of tints of red, or pinks, located along the line 226 in FIG. 3. Additionally, the hues green and blue could be blended to form an array of colors found along line 228 in FIG. 3. These colors can be used for blending other colors.

While mathematical color classification systems may be based on pure, or fully saturated hues, true hues are not available in most real color systems. The HSV system used in the present invention is illustrated in FIG. 4, and includes only the six primary colors described hereinbefore as pure hues. Mixtures of adjacent pure hues form colors that are considered "system hues". Each of the system hues along the lines extending between the pure hues is displaced radially from the circumference toward the center of the cross section of the conical color space. Thus, the saturation is less than full saturation. While the system hues are not pure in nature, they are the most saturated colors available for the corresponding pure hue in the color classification system and serve as hues for the system. For this reason, they are referred to as system hues.

The HSV color characteristic system of FIG. 4, while mathematically constructed with cylindrical coordinates in the manner shown in FIG. 3, does not extend cylindrically downward but rather it converges toward a point 229 at the color black. The system is structured in this manner because as the brightness color characteristic is diminished, colors tend toward black, with colors having lower levels of saturation becoming black at higher levels of brightness. Color systems, such as color monitors, are limited to the colors that can actually be produced by the materials used. The red, green and blue primary phosphors used in color television CRT's do not produce pure hues, but only colors that are desaturated forms of pure hues. Referring to FIG. 5, points 230, 232 and 234 illustrate actual colors of red, green and blue primaries, respectfully, which might be available in a color television CRT mixing medium. By combining adjacent primaries, the full range of system hues is obtained. Mixtures of green and red create the system hues depicted by the line 236; mixtures of red and blue create the system hues depicted by the line 238; and mixtures of blue and green create the system hues depicted by the line 240. By the use of the system hues, an HSV system described by FIG. 4 can be established, which in turn can be transformed or converted mathematically through suitable transforms to either a red, green, blue additive primary color classification system, a cyan, magenta, yellow and black subtractive primary color classification system, or to any other color classification system definitive of a mixing medium in which the selected colors are to be reproduced.

In the preferred embodiment of the invention, the selection and reproduction of color is accomplished in a computer graphics system wherein the color reproduction device 214 is a color television CRT mixing medium, and selected colors used in connection with the formation of graphics images displayed on the CRT screen are created through the illumination of red, green and blue phosphors. For other mixing media of color reproduction, a different color reproduction device 214 is used. A 4-color printing process reproduction device 214, more commonly, printer would use the cyan, magenta, yellow and black subtractive primary color classification system.

The color selection controller 210 is preferably a digital computer working under the control or a program for the selection of hue, saturation and brightness values. Selected values of hues, saturation and value are stored in the computer's memory, and then are transformed to values of red, green and blue. The transformed values are held in memory to be used in producing graphics on the color CRT included in the color reproduction device 214.

Color selection is performed interactively with the operator individually selecting hue, saturation and brightness from displays clearly illustrating the effects of changing each of these characteristics.

The individual color characteristic displays making the display 212 are illustrated in FIG. 1B and preferrably include a hue bar display 250 from which the operator may select a specific hue from the complete range of system hues, a saturation bar 252 from which the operator may view the complete saturation range of the selected hue and select a specific saturatin level and a brightness bar display 254 from which the operator may view brightness values and select a desired brightness value. In addition, a current color display 256 is provided for displaying the color defined by the values of the HSV color characteristics selected by the operator, and is updated as the operator changes the selected values.

In one embodiment of the present invention, the hue bar display 250 illustrates the entire range of system hues so that a single hue may be selected by the operator, thus designating a corresponding value of the hue parameter H in the HSV color characteristic system. The selected hue is designated on the hue bar display by a slide marker 258, which is preferably a vertical black line drawn at the position on the hue bar display corresponding to the selected hue. Because the operator can observe the full range of system hues, the desired hue which is closest to the color ultimately desired can readily be selected. If the entire range of system hues are displayed across the hue bar display, the slide marker 258 is moved across the hue bar display 250 to a position showing the selected hue. In another embodiment of the present invention, a portion of the range of system hues is displayed at one time in the hue bar display 252, and the slide marker 258 is maintained at a fixed position in, for example, the center of the hue bar display. The selected system hue is the one positioned beneath the slide marker 258. The portion of the range of system hues displayed is changed by scrolling the hues through the hue bar display and, by continued scrolling of the hues, the entire range of system hues can be displayed for selection.

The selected hue is preferably also displayed at one end of the saturation bar display 252, which displays the entire available range of saturation of the selected hue from the selected hue at one end to white at the other end. Therefore, the saturation bar display 252 provides a display of the interaction of the selected system hue with the entire range of the saturation color characteristic, which facilitates color selection by the operator. The selection of the interacted characteristics of saturation and hue is designated on the saturation bar display 252 by the position of a slide marker 258. As in the hue bar display 250, the slide marker is preferably a vertical black line drawn at the position on the saturation bar display corresponding to the selected saturation and hue interaction. This selection necessarily results in theselection of a vlaue for the saturation characteristic of the HSV color characteristic system.

A brightness bar display 254 is provided to display the full range of brightness available in the system. In one embodiment of the present invention, brightness is displayed as a gray scale ranging from black at one end to white at the other end, with the currently selected brightness level designated on the display by a slide marker 262, preferably of the kind previously described with respect tot he hue and saturation display bars 250 and 252. In another embodiment of the present invention, an interaction of the brightness characteristic with the selected desaturation hue (itself an interaction of the selected hue and saturation charateristics is displayed int he brightness bar display 254. As discussed hereinbefore with reference to the saturation display bar 252, this display of interaction of the color characteristics facilitates color selection by the operator. The desaturated hue selected from the saturation bar display is displayed at one end of the brightness bar display 254 and the levels of brightness through black, with black displayed at the other end of the bar display. This selection of a brightness necessarily results in the selection of a value for the brightness perameter V of the HSV color characteristic system.

The selected values of H,S and V are converted through the use of appropriate transforms to values of R, G and B in the red, green, blue primary color classification system for display in the current color display 256. Because the selected hue, saturation, brightness color characteristics and the current selected color are illustrated on the display 212 and are immediately updated whenever changes of the H,S or V values occur, the effects of each color characteristic change are displayed to the operator in a manner that facilitates a rapid and interactive selection process.

Selection of hue, saturation and value may be accomplished by any of a number of input devices which are connected to the computer and included in the color selection controller 210. If desired, selection of the desired bar display and movement of the corresponding slide marker can be accomplished through common keyboard cursor contol input. However, it is preferrable to accomplish color selection by the use of a device defining an XY coordinate system which corresponds to locations on the monitor screen so that a cursor may be moved around the screen in response to action of this device to control selection of color. While many input devices, such as a joystick, trackball, light pen or mouse may be used in the preferred embodiment, a data or graphics tablet is used to establish the XY coordinate system with values thereon selected by motion of a pen thereupon. Operation of graphics tablets is well known and is operated by the motion of the pen over the surface of the tablet. In response, a cursor is moved across the screen to positions corresponding to the motion of the pen across the graphics tablet. Activation of a switch, such as by pressing the pen against the tablet, causes a set of XY coordinates to be input to the computer.

By moving the pen across the graphics tablet, the cursor may be positioned in any of the bar displays 250, 252, 254 so that engaging the switch selects a value of the characteristic corresponding to the position of the cursor within the bar display. By maintaining the switch in its engaged state, the value of the characteristic may be altered to the desired value. At the same time, the modified values of the characteristic are used to recompute the displays and provide updated visual color information to the operator.

For example, in the embodiment of the present invention wherein the entire range of system hues are displayed in the hue display bar 250, by placing the cursor within the hue bar display, an operator may select a hue which will be indicated by motion of the slide marker 258 to the location of the cursor. The slide marker may then be moved with the cursor to change the selected hue. The graphics tablet and pen are similarly used to select different values of saturated hues in the saturation bar display 252 and different values of brightness in the brightness bar display 254.

In the embodiment of the present invention where a portion of the entire range of systems hues are displayed, the slide marker 258 remains in a fixed position at the center of the hue bar display to designate the hue positioned under the slide marker as the selected hue moving the pen across the graphics tablet moves the cursor within the bar display causing the position of the hues to move through the display bar in a direction corresponding to the direction of movement of the pen. This scrolls the system hues through the hue bar display. As hue is scrolled, the hue bar display 252 is changed so that the full range of system hues can be shown. As the selected values of hue are changed, the saturation bar display 252 is updated to show the currently selected range of desaturated hue.

If the brightness bar display is of the embodiment illustrating values of brightness of the desaturated hue, this display is updated to show the currently selected value of hue at the currently selected value of saturation. If the embodiment of brightness bar display 254 showing the gray scale from black to white is used, this display is unchanged. In either event, the color corresponding to the currently selected values of H, S and V is shown in the current color display 256.

FIG. 6 represents a block diagram in accordance with the method and apparatus of the present invention. Referring to FIG. 6, terminal 80 and graphics tablet 82 are coupled to computational means 84 by information bus 86. Storage device 88 is coupled to computational means 84 by data bus 90. Computational means 84 is coupled to frame store controller 92 by coupling bus 94. Color camera 96 is coupled to frame store controller 92 by color camera bus 98. Frame store controller 92 has associated therewith address bus 100, data bus 102 and control bus 104, as will be more fully discussed hereinafter. Memory storage devices 106, 108 and 110 are coupled to frame store controller 92 by address bus 100, data bus 102 and control bus 104. Digital-to-analog converters 112, 114 and 116 are coupled respectively to memory storage devices 106, 108 and 110 by analog-to-digital busses 118, 120 and 122 respectively. Digital-to-analog converters 112, 114 and 116 are each further coupled to frame store controller by control bus 104. Digital-to-analog converters 112, 114 and 116 are each individually coupled to RGB/composite output generator 124 by red bus 126, green bus 128 and blue bus 130. RGB/composite output generator 124 is coupled to display device 132 by video output bus 134.

Terminal 80 is further composed of a display device 134 and a keyboard device 136. Display device 134 provides for the visual display of information produced by computation means 84. Keyboard device 136 provides for the specification of information from a user to computational means 84. In particular, display device 134 and keyboard device 136 provide for the bidirectionaldirectional flow of information between a user and computational means 84. Such information generally relates to the operation of computational means 84, including the directing the operation thereof, as well as providing for the display of various status information associated therewith, as will be more fully discussed hereinafter. Graphics tablet 82 is further composed of a surface 138 and a point selection device 140, which devices collectively provide a means for the defining of two-dimensional information by a user for subsequent use by computational means 84. Broadly speaking, such two-dimensional information would represent data information for use with various programs executed by computational means 84. Information bus 86 provides for the coupling of information between computational means 84 and terminal 80 and graphics tablet 138. In particular, information bus 86 provides for the flow of information from computational means 84 and display device 134 of terminal 80, and for the flow of information from keyboard device 136 and graphics tablet 138 to computational means 84. Storage device 88 provides for the permanent storage of information used in connection with computational means 84, and may be further used to store information present in memory storage devices 112, 114 and 116, as will be more fully discussed hereinafter. Computational means 84 is a general purpose digital computer which operates pursuant information from terminal 80, graphics tablet 82 and storage device 88 and memory storage devices 106, 108 and 110 to provide for the control of frame store controller 92, as will be more fully discussed hereinafter. Color camera 96 functions as an input device for supplying information in a visual format to frame store controller 98, as will be more fully discussed hereinafter. Frame store controller 92 provides for the orchestration of the functions of memory storage devices 106, 108 and 110, digital-to-analog converters 112, 114 and 116, and RGB/composite output generator 124, pursuant to information from computational means 84 and color camera 96, as will be more fully described hereinafter. Memory storage devices 106, 108 and 110 provide for the temporary storage of information supplied from computation means 84. In particular, memory storage devices 106, 108 and 110 are each comprised of a large number of storage locations, each of which is individually addressable for the purposes of either storing information therein or reading previously stored information therefrom. Digital-to-analog converters 112, 114 and 116 each function pursuant to digital information received from storage devices 106, 108 and 110 respectively to convert the digital information received into corresponding information in an analog format. RGB/composite output generator 124 functions to produce an appropriate video signal responsive to the analog information from digital-toanalog converters 112, 114 and 116, and timing information from control bus 104 for driving display device 132. Display device 132 provides a visual display responsive to information from RGB/composite output generator 124.

Broadly stated, the operation of the foregoing may be described as follows. Each pixel in a visual display has associated therewith three storage locations, each containing the respective amount of a particular primary color necessary to reproduce the color associated with the pixel. The respective amounts for the color of red for each pixel in the display are stored in storage locations in memory storage device 106. In a similar fashion, the respective amounts for the colors of green and blue for each pixel are stored in storage locations in memory storage devices 108 and 110. Consequently, the storage locations in memory storage devices 106, 108 and 110 collectively contain the respective amounts of the colors red, green and blue necessary to reproduce a color visual display. Digital-to-analog converters 112, 114 and 116 operate to convert the format of the information stored in memory storage devices 106, 108 and 110 from a digital to an analog format suitable for input to RGB/composite output generator 124. In particular, pursuant to control information from frame store controller 92, the information in storage locations in memory storage devices 106, 108 and 110 associated with each pixel is supplied to digital-toanalog converters 112, 114 and 116. Digital-to-analog converters 112, 114 and 116 thereafter convert the information from a digital format as supplied from memory storage devices 106, 108 and 110 to an analog format, and thereafter present the information to RGB/composite output generator 124. RGB/composite output generator 124, pursuant to information received from digital-to-analog converters 112, 114 and 116 and control information received from frame store controller 92 over control bus 104, produces an appropriate signal to drive display device 132. Display device 132, in response to the foregoing information from RGB/composite output generator 124 produces the color visual display. It is consequentially observed that the contents of the storage locations in memory storage devices 106, 108 and 110 will determine the visual information displayed.

In addition to the foregoing, frame store controller 92, pursuant to information from computational means 84, may direct the storage of information provided by computational means 84 in memory storage devices 106, 108 and 110. Consequentially, the contents of a visual display can be directly controlled by computational means 84. In particular, computational means 84 could through coupling bus 94 specify the desired contents of each storage location in memory storage devices 106, 108 and 110 to frame store controller 92. Thereafter, frame store controller 92 would direct the storage of said information in the respective storage locations in memory storage devices 106, 108 and 110. Consequentially, while frame store controller 92 provides for the continuous display of information contained in memory storage devices 106, 108 and 110 through digital-to-analog converters 112, 114 and 116, RGB/composite output generator 124 and display device 132, frame store controller 92 may also access the contents of memory storage devices 106, 108 and 110 pursuant to communications with computational means 84 to direct the storage of information therein. In addition thereto, computational means 84 can determine the current contents of any storage location in memory storage devices 106, 108 and 110. In particular, frame store controller 92, pursuant to instructions from computational means 84 would locate the contents of particlular storage locations in memory storage devices 106, 108 and 110, and thereafter would provide access to the information by computational means 84. Thereafter the information with respect to the contents of storage location in memory storage devices 106, 108 and 110 could either be used in computations performed by computation means 84, or stored for subsequent use in storage device 88.

In accordance with the method and apparatus of the present invention, the foregoing described apparatus would provide for the display of the spectral hues associated with the medium in the following manner. Referring to FIGS. 5 and 10, computational means 84 would perform the steps previously discussed with respect to blocks 80, 82, 84, 86 and 88 of FIG. 5, storing the calculated values for R, G and B in storage locations in memory storage devices 106, 108 and 110. In particular, on each iteration of the loop composed of blocks 84, 86 and 88, the corresponding values of R, G and B would be stored in the appropriate storage locations within memory storage devices 106, 108 and 110 such that the resulting display of the spectral hues appears on display device 132. The particular storage location in memory storage device 106, 108 and 110 in which the information was stored would be determined by the desired location of the information with respect to the display appearing on display device 132.

In further accordance with the method and apparatus of the present invention, the foregoing described apparatus, responsive to the selection of a particular color from the array of spectral hues, would provide for the display of the colors which would result from the mixing of the selected spectral hue with the color of white in the following manner. Referring to FIGS. 6 and 10, computational means would perform the steps previously discussed with respect to blocks 90, 92, 94, 96, 98 and 100. In particular, computational means would determine the selected value for H from either terminal 80 or graphics tablet 82. In this regard, there are various methods which may be employed in the process of describing a particlular color, including an interactive technique wherein a user may select a color from the array of colors which are displayed by display device 132. Notwithstanding the particular technique employed in the process of selecting a particular color, the selection thereof would be communicated to computational means 84. Thereafter, pursuant to the selection of a particular color, the results of the calculations performed in block 96 would be stored in storage locations in memory storage devices 106, 108 and 110, pursuant to control functions of frame store controller 92. The particular storage locations wherein the foregoing information would be stored would depend upon the particular location on the resulting display wherein said information was desired to be displayed.

In further accordance with the method and apparatus of the present invention, the foregoing described apparatus, responsive to the selection of a particular color from the array of colors displayed as a result of the process of FIG. 6, would provide for the display of the array of colors resulting from the mixing of the selected color with portions of the color black in the following manner. Referring to FIGS. 7 and 10 computational means 84 would perform the steps previously discussed with respect to blocks 102, 104, 106, 108, 110 and 112. In particular, computational means would determine the selected values for H and S from either terminal 80 or graphics tablet 82. In this regard, there are various methods which may be employed in the process of describing a particlular color, including an interactive technique wherein a user may select a color from the array of colors which are displayed by display device 132. Notwithstanding the particular technique employed in the process of selecting a particular color, the selection thereof would be communicated to computational means 84. Thereafter, pursuant to the selection of a particular color, the results of the calculations performed in block 108 would be stored in storage locations in memory storage devices 106, 108 and 110, pursuant to control functions of frame store controller 92. The particular storage locations wherein the foregoing information would be stored would depend upon the particular location on the resulting display wherein said information was desired to be displayed.

In further accordance with the method and apparatus of the present invention, the foregoing described apparatus, responsive to the selection of a particular color from the array of spectral hues displayed as a result of the process of FIG. 5, would provide for the display of the array of colors resulting from the mixing of the selected color with portions of the colors of white and black in the following manner. Referring to FIGS. 8 and 10, computational means 84 would perform the steps previously discussed with respect to blocks 120, 122, 124, 126, 128, 130, 132, 134 and 136. In particular, computational means would determine the selected value for H from either terminal 80 or graphics tablet 82. In this regard, there are various methods which may be employed in the process of describing a particlular color, including an interactive technique wherein a user may select a color from the array of colors which are displayed by display device 132. Notwithstanding the particular technique employed in the process of selecting a particular color, the selection thereof would be communicated to computational means 84. Thereafter, pursuant to the selection of a particular color, the results of the calculations performed in block 126 would be stored in storage locations in memory storage devices 106, 108 and 110, pursuant to control functions of frame store controller 92. The particular storage locations wherein the foregoing information would be stored would depend upon the particular location on the resulting display wherein said information was desired to be displayed.

In further accordance with the method and apparatus of the present invention, the foregoing described apparatus would provide for the display of the array of colors resulting from the mixing of each of the colors appearing the the array of spectral hues with portions of the colors of white and black in the following manner. Referring to FIGS. 9 and 10, computational means 84 would perform the steps previously discussed with respect to blocks 140, 142, 144, 146, 148, 150, 152, 154, 156, 158 and 160. Thereafter, the results of the calculations performed in block 144 would be stored in storage locations in memory storage devices 106, 108 and 110, pursuant to control functions of frame store controller 92. The particular storage locations wherein the foregoing information would be stored would depend upon the particular location on the resulting display wherein said information was desired to be displayed.

In addition to the foregoing, in accordance with the method and apparatus of the present invention, the foregoing described apparatus provides for the interactive specification and changing of a color by a user of the apparatus, as more fully described in FIG. 11. Referring to FIG. 11, the values of H, S and V are initially assigned the values of 0, 1 and 1 respectively in block 140. Thereafter in block 142, the spectral hues are displayed as more fully discussed with reference to FIGS. 5 and 10. Thereafter, in block 144 a particular hue is selected by a user from the array of spectral hues displayed by block 142. The selection of a particular hue will define a particular value for the variable H. Thereafter in block 146 the array of colors which result from the mixing of the selected hue with various portions of the color white is determined, as more fully previously discussed with reference to FIGS. 6 and 10. Thereafter in block 148 the array of colors which result from the mixing of the the selected hue with various portions of the color of black is determined in block 148, as more fully previously discussed with reference to FIGS. 7 and 10. Consequentially as a result of the foregoing, there is displayed the array of spectral hues, the array of desaturated colors associated with a particular hue chosen from the array of spectral hues, and the array of colors which result from the mixing of the selected hue with portions of the color black. Thereafter in block 152 a determination is made if the user has changed the value associated with S, i.e., has the user specified a different value of saturation. If the user has changed the value of S, then the foregoing process is repeated from block 148. If the user has not changed the value of S, then in block 154 a determination is made if the user has changed the value associated with H, i.e., has the user specified a different spectral color. If the user has specified a different spectral color, then the foregoing process is repeated from block 146. If the user has not changed the value of S, then a determination is made if the user desires to exit from the foregoing procedure in block 156. If the user does not desires to exit from the foregoing procedure, then the foregoing is repeated from block 150, otherwise the foregoing procedure is terminated.

In accordance with the method and apparatus of the present invention, a user may specify or change a particular color in an interactive manner in the following manner. Referring to FIGS. 11 and 10, computational means 84 would perform the steps previously discussed with respect to blocks 140, 142, 144, 146, 148, 148, 150, 152 and 154. In particular, computational means 84 would determine the selected value of H and any changes in the values of S or V from either terminal 80 or graphics tablet 82. In this regard, there are various methods which may be employed in this process, including an interactive technique wherein a user may specify a parameter in terms of the display associated with display device 132. Notwithstanding the particular technique employed in the process of specifying a value for a parameter, the results of the calculations performed in blocks 142, 146 and 148 would be stored in memory storage devices 106, 108 and 110, pursuant to control functions of frame store controller 92. The particular storage locations wherein the foregoing information would be stored would depend upon the particular location on the resulting display wherein said information was desired to be displayed.

In addition to the foregoing, in accordance with the method and apparatus of the present invention, a color may be specified in the RGB color space, and the particular components thereof in the HSV color space determined. Thereafter, parameters which are associated with the color may be changed, and the color resulting therefrom displayed. Referring to FIG. 10, color camera 96 provides for the specification of a color. In particular, a color which is provided to the foregoing apparatus by color camera 96 is converted from an analog to a digital format by frame store controller 92. Thereafter,, frame store controller 92 would provide for the storage of the color in memory storage devices 106, 108 and 110. Thereafter, computational means 84 would, pursuant to instructions from a user entered by terminal 80, interrogate the contents of memory storage devices 106, 108 and 110 to determine the respective RGB components of the color, and thereafter perform the conversion to the corresponding HSV values through the use of the RGB HSV transform previously discussed. The results of the foregoing transform, i.e., the value of the parameters would be displayed on display device 132. Thereafter, the user could change any of the particular parameters, and computational means 84 in response thereto would determine the RGB components of the resulting color. Thereafter, computational means 84 would provide for the storage of the resulting RGB components in storage location in memory storage devices 106, 108 and 110. The particular storage locations wherein the foregoing information would be stored would be determined by the desired location for the resulting color on the display of display device 132. Consequently, according to the method and apparatus of the present invention, a particular color may be specified, and thereafter the colors which result from variations in the particular values descriptive of the color displayed.

FIG. 11 illustrates a method for the interactive specification of parameters associated with a color.

FIGS. 7A and 7B illustrate flow charts of programs executed by the computer included in the computation means 84 for generating the hue bar displays. FIG. 7A illustrates the flow chart of the program for generating a hue bar display capable of simultaneously displaying the full range of system hues. Referring to FIG. 7A, the variables of H, S and V are initially assigned the values of 0, 1 and 1 respectively in block 80. Thereafter, an incrementing value is assigned to the variable delta H in block 82. The variable delta H is used to increment the value of the variable H in a subsequent incrementing process. In practice, the value chosen for delta H will be dependent upon the particular application, and determined in part by the the smallest perceivable difference in spectral hues possible in a particular medium. Thereafter, the HSV RGB transform is used in block 84 to determine the corresponding values of R, G and B to represent the particular color described by the associated values of H, S and V. Next, in block 86, a determination is made if the value of H has exceeded the maximum value. The particular maximum value against which H is compared will depend upon the particular implementation and the particular representation used for H, i.e., if H is measured in degrees, then 360 degrees would represent the maximum value for H. If the value for the variable H is less than the maximum value, then the variable H is incremented in block 88, and the above process repeated from block 84. If the value for the variable H has exceeded the maximum value, then the process is completed as the corresponding values in the RGB color space have been determined for the range of spectral hues in the HSV color space in increments of delta H. From the foregoing it is observed that the steps in FIG. 5 will produce the array of spectral hues. A particular portion of the array of spectral hues could likewise be produced by decreasing the step increment, i.e., delta H, and permitting the variable H to assume values between selected limits. Consequently, by using such a technique, an expanded display of any selected portion of the spectral hues cold be obtained.

FIG. 7B illustrates the flow chart of the program for generating a hue bar display similar to FIG. 7A, but which is limited in display range, and thus displays the full range of system hues, a portion at a time.

In further accordance with the method and apparatus of the present invention, a particular color may be selected from the array of spectral hues, and the colors which result from the addition of the color of white thereto may be determined and displayed in the RGB color space. FIG. 6 illustrates the foregoing. Referring to FIG. 6, a particular numeric hue value is first identified from the array of spectral hues in block 90. The selection of a particular color will define a particular value for the variable H. Thereafter, the variables S and V are assigned the value of 0 in block 92. In block 94 an incrementing value is assigned to the variable delta S. The variable delta S is used to increment the value of the variable S in the subsequent incrementing process. In practice, the value chosen for delta S will be dependent upon the particular application, and determined in part by the smallest difference in saturation which can be perceived in a particular medium. Thereafter in block 96 the corresponding values in the RGB color space are determined for the current values of the variables H, S and V. Thereafter in block 98 the current value of the variable S is checked to determine if the maximum value for the variable S has been exceeded. If the maximum value for the variable S has not been exceeded, then the variable S is incremented in block 100, and the process repeated from block 96. If the value for the variable S is greater than the maximum value, then the process is complete, and the colors corresponding to the mixing of the selected color with the color white over the range of values from 0 to 100% in increments of delta S have been determined in the RGB color space.

FIGS. 9A and 9B illustrate flow charts of programs executed by the computer included in the computation means 84 for generating brightness bar displays. FIG. 9A illustrates the flow chart of the program for generating a brightness bar display which displays the full range of brightness extending from black to white. Referring to FIG. 7, a particular color is first selected in block 102 from the array of colors produced in accordance with the procedure discussed with reference to FIG. 6. The selection of a particular color would define particular values for the variables of H and S. Thereafter the value of 1 is assigned to a variable V in block 104. Thereafter a value is assigned to the variable delta V in block 106. The variable delta V is used to decrement the value of the variable V in the subsequent decrementing process. In practice, the value chosen for delta V will be dependent upon the particular application, and determined in part by the smallest difference in brightness which can be perceived in a particular medium. Thereafter the corresponding values in the HSV RGB color space are determined for the current values of H, S and V in block 108 through the use of the HSV RGB transform. Thereafter, the value for the variable V is checked against it's minimum value in block 110. If the value for the variable V is not less than it's minimum value, then the value for the variable V is decremented in block 112, and the process repeated from block 108. If the value for the variable V is less than it's minimum value, then the process is complete, and the colors corresponding to the to the mixing of the selected color with the color black from 0 to 100% in incremental steps of delta V have been determined in the RGB color space.

In a similar manner, FIG. 9B illustrates the flow chart of the program for generating a brightness bar display which displays the full range of brightness extending from black to the currently selected desaturated hue.

In further accordance with the method and apparatus of the present invention, a particular color may be selected from the array of spectral hues, and the colors which result from the mixing of the selected color with portions of the colors white and black may be determined and displayed in the RGB color space. FIG. 8 illustrates the process. Referring to FIG. 8, a particular color is first selected from the array of spectral hues in block 120. Thereafter, the value of 1 is assigned to the variables of S and V in block 122. Thereafter values are assigned to the variables delta S and delta V in block 124, as previously discussed with reference to FIGS. 6 and 7. Next, the corresponding values for R, G and B are determined for the current values of H, S and V through the use of the HSV RGB transform in block 126. Thereafter, the value for the variable V is checked against the minimum value for the variable V in block 128. If the value for the variable V is not less than the minimum value for the variable V, then the current value for the variable V is decremented in block 130, and the process repeated from block 126. If the current value for the variable V is less than the minimum value, then the variable V is set equal to the value of 1 in block 132, and the current value of the variable S is checked against its minimum value in block 134. If the current value for the variable S is not less than the minimum value for the variable S, then the variable S is decremented in block 136, and the process repeated from block 126. If the current value of the variable S less than the minimum value for the variable S, then the process is complete, and the colors which result from the mixing of a selected color from the array of spectral hues with the colors of white and black in increments of delta S and delta V respectively have been determined in the RGB color space.

In yet further accordance with the method and apparatus of the present invention, all colors present within a particular color gamut may be determined and displayed in the RGB color space. FIG. 9 illustrates the process. Referring to FIG. 9, the variables of H, S and V are initially assigned the values of 0, 1 and 1 respectively in block 140. Thereafter in block 142, a value is assigned to a variable delta H. The variable delta H is used to increment the value of the variable H in a subsequent incrementing process. In practice, the value chosen for delta H will be dependent upon the particular application, and determined in part by the smallest difference which may be perceived between spectral hues in a particular medium. In a similar manner values are assigned to the variables delta S and delta V, as previously discussed. Thereafter in block 144 the corresponding values for the variables R, G and B are determined from the current values of H, S and V through the use of the HSV RGB transform. Thereafter the current value of the variable V is checked against the minimum value for the variable V in block 146. If the current value for the variable V is not less than the minimum value, then the current value for the variable V is decremented in block 148, and the process repeated from block 144. If, however, the current value for the variable V is less than the minimum value, then the value for the variable V is set equal to the value of 1 in block 150, and the current value for the variable S is next checked against the minimum value for the variable S in block 152. If the current value for the variable S is not less than the minimum value, then the current value for the variable S is thereafter decremented in block 154, and the process repeated from block 144. If however, the current value for the variable S is less than the minimum value for the variable S, then the value for the variable S is set equal to 1 in block 156. The current value for the variable H is next checked against its maximum value in block 158. If the current value for the variable H is not greater than its maximum value, then the current value for the variable H is incremented in block 160, and the process repeated from block 144. If however the current value for the variable S is greater than its maximum value, then all colors present within a particular color gamut have been determined and may be displayed in the RGB color space.

The routine used in the preferred embodiment of the present invention to perform the conversion from the HSV color space to the RGB color space, i.e., the HSV RGB conversion routine is given in Table 1.

TABLE 1

```
/*********************************************************
**********/
/* hsvrgb - an internal routine for converting the
values in */
/* 'Hue', 'Sat' & 'Val' to 'Red', 'Green' &
'Blue' */
/*********************************************************
**********/
static hsvrgb@
    §
    register int h, f, i, m, n, k;
    /*
    This is based upon Alvy Smith's conversion in '78
SIGGRAPH proc.
    *
    h = 3 * Hue;
    i = h ¶ ¶ 7;
    f = h − (i §§ 7);
    m = ((Val ¶ ¶ 1) * (255 − Sat)) ¶ ¶ 7;
    n = ((Val ¶ ¶ 1) * (255 − ((Sat * f) ¶ ¶ 7))) ¶ ¶ 7; k =
((Val ¶ ¶ 1) * (255 − ((Sat * (127 − f)) ¶ ¶ 7))) ¶ ¶ 7;
    switch (i)
        §
        case 0:
                Red = Val;
                Green = k;
                Blue = m;
                break;
        case 1:
                Red = n;
                Green = Val;
                Blue = m;
                break;
        case 2:
                Red = m;
                Green = Val;
                Blue = k;
                break;
        case 3:
                Red = m;
                Green = n;
                Blue = Val;
                break;
        case 4:
                Red = k;
                Green = m;
                Blue = Val;
                break;
        case 5:
                Red = Val;
                Green = m;
        ¶       Blue = n;
¶
```

In a similar fashion, a color specified in the RGB color space may be likewise specified in terms of the HSV color space. Such a procedure is used in the process of determining the particular components of a color in terms of the parameters of H, S and V and thereafter displaying the colors which result from changes in any of said parameters. The routine used in the preferred embodiment to perform the conversion from RGB color space to HSV color space, i.e., the RGB HSV conversion routine, is given in Table 2.

TABLE 2

```
/*********************************************************
**********/
/* rgbshv an internal routine for converting the
```

TABLE 2-continued

```
values of */
/* 'Red', 'Green' & 'Blue' to 'Hue', 'Val' &
'Sat' */
/*********************************************************_
**********/
static rgbhsv@
    §
    register int max, min, range;
              int r, g, b;
    max = (Green ¶ Red)? Green : Red;
    if (Blue    max)
        max = Blue;
    min = (Green § Red)? Green : Red;
    if (Blue § min)
        min = Blue;
    range = max − min;
    if (range == 0)
        range = 1;
    if (max == 0)
        §
        Val == 0;
        return;
        ¶
    Sat = ((range §§ 7) / max) §§ 1;
    if (Sat    255)
        Sat = 255;
    if (Sat == 0)
        §
        Val = max;
        return; /* it's white; leave hue & sat
unchanged*/
        ¶
    r = ((max − Red) §§ 7) / range;
    g = ((max − Green) §§ 7) / range;
    b = ((max − Blue) §§ 7) / range;
    if (Red ==max)
        Hue = (Green == min)? ((5*128+b−1)/3:
(128−g)/3; else if (Green == max)
        Hue = (Blue == min)? (128+r)/3 : ((3*128)−b)
/3;
    else
        Hue = (Red == min)? ((3*128)+g)/3:
((5*128)−r)/3; Val = max;
```

Broadly stated, a black and white picture may be reproduced by dividing the surface area thereof up into a large number of individual areas, and assigning a particular brightness to each of the individual areas. The sharpness of the resulting picture would of course be determined by the number of individual areas chosen: the larger the number of individual areas, the greater the sharpness of the resulting picture. The term picture element, or "pixel" is generally used to refer to the individual picture elements. For a black and white picture, each pixel contained therein would have a value for brightness associated therewith. In a similar manner, a color picture may be defined by a large number of individual points contained therein, each point having a particular color associated therewith. From the foregoing, it is clear that with respect to the video medium, a picture may be produced by dividing a screen on a cathode-ray tube up into a large number of pixels, and thereafter assigning individual values to each such pixel. In particular, for a color picture to be produced in such a system employing the primary colors of red, green and blue, i.e. using three different types of phosphors which respectively emit light having a color of red, green and blue, each pixel would in have a color associated therewith defined in terms of the amount of colors of red, green and blue required to be mixed to produce the desired color associated with the particular pixel. Consequently, a color picture may be defined by a large number of pixels, each of which having unique values for each of the respective primary colors of red, green and blue associated therewith.

While the foregoing has been described in terms of a particular apparatus in a particular color space with particular mathematical transforms, it is to be understood that the foregoing is not to be understood to be therefore limiting of the invention herein.

What is claimed is:

1. Apparatus for selecting a color as a function of a first set of color characteristics for implementation as a function of a second set of color characteristics, said apparatus comprising:

first display means for generating a display indicative of a plurality of values of one color characteristic included in said first set and a constant value of at least one other color characteristic of said first set;

means for selecting a value of said displayed one color characteristic;

second display means for generating a display indicative of a relationship between values of an other color characteristic included in said first set and said selected value of said one color characteristic;

means for selecting a value of said displayed other color characteristic;

means for converting said selected values to values of said second set of color characteristics defining said color; and means for implementing said color as a function of the values of said second set of color characteristics.

2. The apparatus of claim 1, including:

means for generating a display indicative of a relationship between values of a third color characteristic included in said first set and the selected values of said first and second color characteristics; and means for selecting a value of said displayed third color characeristics.

3. The apparatus of claim 1, including:

means for generating a display indicative of values of a third color characteristic included in said first set; and means for selecting a value of said displayed third color characteristic.

4. The apparatus of claim 1 wherein said one color characteristic has a range of values, and said first display means generate a display indicative of said range of values.

5. The apparatus of claim 1 wherein said one color characteristic has a range of values, and said first display means generates a display indicative of a portion of said range of values.

6. The apparatus of claim 5 including means for scrolling said first display means for generating a display indicative of an additional portion of said range of values.

7. Apparatus for selecting a color as a function of a first set of color characteristic of hue, saturation and brightness for implementation as a function of a second set of color characteristics, said apparatus comprising:

means for generating a display indicative of a plurality of values of hue; and a constant value of at least one of saturation or brightness;

means for selecting a value of said displayed values of hue;

means for generating a display indicative of a relationship between values of saturation and said selected value of hue;

means for selecting a value of said displayed values of saturation;

means for selecting a value of brightness;

means for converting said selected values to values of said second set of color characteristics defining said color; and means for implementing said color as a function of the values of said second set of color characteristics.

8. Apparatus for selecting a color as a function of a first set of color characteristics of hue, saturation and brightness for implementation as a function of a second set of color characteristics, said apparatus comprising:

means for generating a display indicative of a plurality of values of hue and a constant value of at least one of saturation or brightness;

means for selecting a value of said displayed values of hue;

means for generating a display indicative of a relationship between values of saturation and said selected value of hue;

means for selecting a value of said displayed values of saturation;

means for generating a display indicative of values of brightness;

means for selecting a value of said display values of brightness;

means for converting said selected values to values of said second set of color characteristics defining said color; and means for implementing said color as a function of the values of said second set of color characteristics.

9. A method for selecting a color as a function of a first set of color charateristics for implementation as a function of a second set of color characteristics, said method comprising the steps of:

generating a display indicative of a plurality of values of one color characteristic included in said first set and a constant value of at least one other color characteristic of said first set;

selecting a value of said displayed one color characteristic;

generating a display indicative of a relationship between values of an other color characteristic included in said first set and said selected value of said one color characteristic;

selecting a value of said displayed other color characteristic;

converting said selected values to values of said second set of color characteristics defining said color; and implementing said color as a function of the values of said second set of color characteristics.

10. The method of claim 9, including the additional steps of:

generating a display indicative of a relationship between values of a third color characteristic included in said first set and the selected values of said first and second color characteristics; and selecting a value of said displayed values of said third color characteristic.

11. The method of claim 9, including the additional steps of:

generating a display indicative of values of a third color characteristic included in said first set; and selecting a value of said displayed third color characteristic.

12. Apparatus for selecting a color as a function of a first set of color characteristic for implementation as a function of a second and third set of color characteristics, said apparatus comprising:

means for generating a display indicative of a plurality of values of one color characteristic included in said first set and a constant value of at least one other color characteristic of said first set;

means for selecting a value of said displayed one color characteristic;

means for generating a display indicative of a relationship between values of an other color characteristic included in said first set and said selected value of said cone color characteristic;

means for selecting a value of said displayed other color characteristic;

means for converting said selected values to values of said second set of color characteristic defining said color;

means for implementing said color as a function of the values of said second set of color characteristics;

means for converting said selected values to values of said third set of color characteristics defining said color; and means for implementing said color as a function of the values of said third set of color characteristic.

13. In a computer graphics system, apparatus for selecting a color as a function of hue, saturation and brightness for implementation as a function of red, green and blue, said apparatus comprising:

means for generating a first display indicative of a plurality of values of hue and a constant value of at least one of saturation or brightness;

means for selecting a value of said displayed values of hue;

means for generating a second display indicative of a relationship between values of saturation and said selected value of hue;

means for selecting a value of said displayed values of saturation from said second display;

means for generating a third display indicative of a relationship between values of brightness and said selected values of hue and saturation;

means for selecting a value of said displayed value of brightness from said third display;

means for converting said selected values of hue, saturation and brightness to values of red, green and blue; and means for displaying said color as a function of the values of red, green and blue.

14. In a computer graphic system, apparatus for selecting a color as a function of hue, saturation and brightness for implementation as a function of red, green and blue, said apparatus comprising:

means for generating a first display indiative of a plurality of values of hue and a constant value of at least one of saturation or brightness;

means for selecting a value of said displayed values of hue;

means for generating a second display indicative of a relationship between values of saturation and said selected value of hue;

means for selecting a value of said displayed values of saturation;

means for generating a third display indicative of values of brightness;

means for selecting a value of said displayed values of brightness;

means for converting said selected values of hue, saturation and brightness to values of red, green and blue defining said color; and means for displaying said color as a function of the values of red, green and blue.

15. Apparatus for the selection of a color as defined by a set of color characteristics belonging to a single color characteristic system, said apparatus comprising:

means for displaying a first range of colors defined by a range of values of a first color characteristic from a first color characteristic system, where a second and a third color characteristic in the first color characteristic system are constant;

means for selecting a color from the first range of colors, said color defining a value for said first color characteristic;

means for displaying a second range of colors defined by a range of values of said second color characteristic from the first color characteristic system, where the first color characteristic is the value selected and the third color characteristic is constant;

means for selecting a color from the second range of colors, said color defining a value for said second color characteristic;

means for displaying a third range of colors defined by a range of values of said third color characteristic from the first color characteristic system, where the first and second color characteristics are the values selected;

means for selecting a color from the third range of colors, said color defining a value for said third color characteristic;

means for converting the selected values of the first color characteristic system to values of a second color characteristic system defining said color; and means for selecting said color according to the values of the second color characteristic system.

16. Apparatus for the selection of a color as defined by a set of color characteristics belonging to a single color characteristic system, said apparatus comprising:

means for displaying a first range of colors defined by a range of values of a first color characteristic from a first color characteristic system, where a second and a third color characteristic in the first color characteristic system are constant;

means for selecting a color from the first range of colors, said color defining a value for said first color characteristic;

means for displaying a second range of colors defined by a range of values of said second color characteristic from the first color characteristic system, where the first color characteristic is the value selected and the third color characteristic is constant;

means for selecting a color from the second range of colors, said color defining a value of said second color characteristic;

means for displaying a third range of colors defined by a range of values of said third color characteristic from the first color characteristic system, where the first color characteristic is the value selected and the second color characteristic is constant;

means for selecting a color from the third range of colors, said color defining a value for said third color characteristic;

means for converting the selected values of the first color characteristic system to values of a second color characteristic system defining said color; and means for selecting said color acording to the values of the second color characteristic system.

17. Apparatus for the selection of a desired color defined by values of a set of color characteristics of a single color characteristic system, said apparatus comprising:
- means for generating a display of first colors defined by a plurality of values of a first color characteristic of said set of color characteristics and a constant value of at least one other color characteristic of said set of color characteristics;
- means for selecting one of the displayed first colors defined by one of said values of said first color characteristic;
- means for generating a display of second colors defined by a plurality of values of a second of said set of color characteristics and said value selected defining one of the displayed first colors;
- means for selecting one of the displayed second colors defined by one of said values of said second color characteristics; and
- means for selecting said desired color according to the values defining said selected colors.

18. Apparatus for the selection of color as defined by values of hue, saturation and brightness for implementation as values of red, blue and green, said apparatus comprising:
- means for displaying a first range of colors defined by a range of values of hue, where values for saturation and brightness are constant;
- means for selecting a color from the first range of colors, said color defining a value of hue;
- means for displaying a second range of colors defined by a range of values of saturation, where the value of hue is the value selected and the value of brightness is constant;
- means for selecting a color from the second range of colors, said color defining a value of saturation;
- means for displaying a third range of colors defined by a range of values of brightness, where the values of hue and saturation are the values selected;
- means for selecting a color from the third range of colors, said color defining a value of brightness;
- means for converting the selected values of hue, saturation and brightness to values of red, blue and green defining said color; and
- means for implementing the values of red, blue and green.

19. Apparatus for the selection of a color as defined by values of hue, saturation and brightness implementation as values of red, blue and green, said apparatus comprising:
- means for displaying a first range of colors defined by a range of values of hue, where values for saturation and brightness are constant;
- means for selecting a color from the first range of colors, said color defining a value of hue;
- means for displaying a second range of colors defined by a range of values of saturation, where the value of hue is the value selected and the value of brightness is constant;
- means for selecting a color from the second range of colors, said color defining a value of saturation;
- means for displaying a third range of colors defined by a range of values of brightness, where the value of hue is the value selected and the value of saturation is constant;
- means for selecting a color from the third range of colors, said color defining a value of brightness;
- means for converting the selected values of hue, saturation and brightness to values of red, blue and green defining said color; and
- means for implementing the values of red, blue and green.

20. Apparatus for selecting a desired color as a function of a first set of color characteristics of hue, saturation and brightness for implementation as a function of a second set of color characteristics, said apparatus comprising:
- means for generating a display bar of colors defining a plurality of values of hue and a constant value of at least one of saturation or brightness;
- means for selecting a color defining a value of hue;
- means for generating a display bar of colors defining a plurality of values of saturation and said selected value of hue;
- means for selecting a color defining a value of saturation;
- means for generating a display bar of colors defining a plurality of values of brightness;
- means for selecting a color defining a value of brightness;
- means for converting said values defining said selected colors to values of said second set of color characteristics defining said desired color; and
- means for implementing said desired color as a function of the values of said second set of color characteristics.

21. Apparatus of claim 17 wherein said plurality of values of said first of said set of color characteristics is a range of values.

22. Apparatus of claim 17 wherein said plurality of values of said second of said set of color characteristics is a range of values.

23. Apparatus of claim 17 wherein said means for generating said display of first colors generates said display of first colors further defined by a fixed value of said second of said set of color characteristics.

24. Apparatus of claim 17 further comprising:
- means for generating a display of third colors defined by a plurality of values of a third of said set of color characteristics and said value selected defining one of the displayed first colors; and
- means for selecting one of the displayed third colors defined by one of said values of said third color characteristic.

25. Apparatus of claim 17 further comprising:
- means for generating a display of third colors defined by a plurality of values of a third of said set of color characteristics and said values selected defining one of the displayed first and second colors; and
- means for selecting one of the displayed third colors defined by one of said values of said third color characteristic.

26. Method for the selection of a desired color defined by values of a set of color characteristics of a single color characteristic system comprising the steps of:
- generating a display of first colors defined by a plurality of values of a first color characteristic of said set of color characteristics and a constant value of at least one other color characteristic of said set of color characteristics;
- selecting one of the displayed first colors defined by one of said values of said first color characteristics;
- generating a display of second colors defined by plurality of values of a second of s aid set of color characteristics and said value selected defining one of the displayed first colors;

selecting one of the displayed second colors defined by one of said values of said second color characteristic; and selecting said desired color according to the values defining said selected colors.

27. Method of claim 26 comprising the additional steps of:

generating a display of third colors defined by a plurality of values of a third of said set of color characteristics and said value selected defining one of the displayed first colors; and selecting one of the displayed third colors defined by one of said values of said third color characteristic.

28. Method of claim 26 comprising the additional steps of;

generating a display of third colors defined by a plurality of values of a third of said set of color characteristics and said values selected defining one of the displayed first and second colors; and selecting one of the displayed third colors defined by one of said values of said third color characteristic.

29. Apparatus for the selection of a color defined by values of a set color characteristic of a single color characteristic system, said apparatus comprising:

means for generating a display of first colors indicative of a plurality of values of a first color characteristic of said set of color characteristics and a constant valve of at least one other color characteristic of said set of color characteristics;

means for selecting a displayed first color to obtain a value of said first color characteristic;

means for generating a display of second colors indicative of both (i) a plurality of values of a second of said set of color characteristics, and (ii) of said obtained value of said first color characteristic;

means for selecting a displayed second color to obtain a value of said second color characteristic; and means for coupling the obtained values of the color characteristics for selection of the color defined thereby.

30. Apparatus of claim 29 wherein said plurality of values of said first of said set of color characteristics is a range of values.

31. Apparatus of claim 29 wherein said plurality of values of said second of said set of color characteristics is a range of values.

32. Apparatus of claim 29 further comprising:

means for generating a display of third colors indicative of both (i) a plurality of values of a third of said set of color characteristics, and (ii) of said obtained value of said first color characteristic; and means for selecting a displayed third color to obtain a value of said third color characteristic.

33. Apparatus of claim 29 further comprising:

means for generating a display of third colors indicative of both (i) a plurality of values of a third of said set of color characteristics, and (ii) of said obtained values of said first and second color characteristics; and means for selecting a displayed third color to obtain a value of said third color characteristic.

34. Method for the selection of a color defined by values of a set of color characteristics of a single color characteristic system comprising the steps of:

generating a display of first colors indicative of a plurality of values of a first color characteristic of said set of color characteristics and a constant value of at least one other color characteristic of said set of color characteristics;

selecting a displayed first color to obtain a value of said first color characteristic;

generating a display of second color indicative of both (i) a plurality of values of a second of said set of color characteristics, and (ii) of said obtained value of said first color characteristic;

selecting a displayed second color to obtain a value of said second color characteristic; and coupling the obtained values of the color characteristics for selection of the color defined thereby.

35. The method of claim 34 comprising the additional steps of:

generating a display of third colors indicative of both (i) a plurality of values of a third of said set of color characteristics, and (ii) of said obtained value of said first color characteristic; and selecting a displayed third color to obtain a value of said third color characteristic.

36. The method of claim 34 comprising the additional steps of:

generating a display of third colors indicative of both (i) a plurality of values of a third of said set of color characteristics, and (ii) of said obtained values of said first and second color characteristics; and selecting a displayed third color to obtain a value of said third color characteristic.

* * * * *

UNITED STATES PATENT AND TRADEMARK OFFICE
CERTIFICATE OF CORRECTION

PATENT NO. : 4,721,951

DATED : January 26, 1988

INVENTOR(S) : Peter B. Holler

It is certified that error appears in the above-identified patent and that said Letters Patent is hereby corrected as shown below:

```
Column  5, line 67, delete "scried", insert --scribed--;
Column  8, line 15, delete "saturatin", insert --saturation--;
           line 63, delete "theselection", insert --the
                      selection--;
           line 63, delete "vlaue", insert --value--;
Column  9, line  4, delete "tot he", insert --to the--;
           line  9, delete "int he", insert --in the--;
           line 18, delete "perameter", insert --parameter--;
           line 37, delete "contol", insert --control--;
Column 10, line 63, delete "tionaldirectional", insert
                      --tional--;
Column 11, line 49, delete "toanalog", insert --to-analog--;
Column 12, line  8, delete "toanalog", insert --to-analog--;
Column 14, line 33, delete "the the", insert --in the--;
           line 64, delete "of the the", insert --of the--;
Column 15, line 26, delete "148" (second occurrence);
           line 55, delete "," (secnd occurrence);
Column 16, line 28, delete "the" (second occurrence);
           line 54, delete "cold", insert --could--;
Column 17, line 42, delete "HSV";
           line 52, delete "to the" (second occurrence);
Column 20, line 63, delete "in";
```

UNITED STATES PATENT AND TRADEMARK OFFICE
CERTIFICATE OF CORRECTION

PATENT NO. : 4,721,951

DATED : January 26, 1988

INVENTOR(S) : Peter B. Holler

Page 2 of 2

It is certified that error appears in the above-identified patent and that said Letters Patent is hereby corrected as shown below:

Column 23, line 10, delete "cone", insert --one--.

Signed and Sealed this

Twenty-seventh Day of December, 1988

Attest:

DONALD J. QUIGG

Attesting Officer

Commissioner of Patents and Trademarks